(12) United States Patent
Galitsky

(10) Patent No.: US 11,182,412 B2
(45) Date of Patent: Nov. 23, 2021

(54) SEARCH INDEXING USING DISCOURSE TREES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 373 days.

(21) Appl. No.: 16/142,759

(22) Filed: Sep. 26, 2018

(65) Prior Publication Data

US 2019/0095522 A1 Mar. 28, 2019

Related U.S. Application Data

(60) Provisional application No. 62/563,806, filed on Sep. 27, 2017.

(51) Int. Cl.
| | |
|---|---|
| *G06F 16/20* | (2019.01) |
| *G06F 16/31* | (2019.01) |
| *G06F 16/332* | (2019.01) |
| *G06F 16/33* | (2019.01) |
| *G06F 40/35* | (2020.01) |
| *G06F 40/211* | (2020.01) |
| *G06F 40/30* | (2020.01) |

(52) U.S. Cl.
CPC .......... *G06F 16/322* (2019.01); *G06F 16/313* (2019.01); *G06F 16/3329* (2019.01); *G06F 16/3331* (2019.01); *G06F 40/211* (2020.01); *G06F 40/35* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 5,495,605 A | | 2/1996 | Cadot |
| 6,112,168 A | * | 8/2000 | Corston ................ G06F 40/253 704/9 |
| 6,731,307 B1 | | 5/2004 | Strubbe et al. |
| 7,152,031 B1 | | 12/2006 | Jensen et al. |
| 7,519,529 B1 | | 4/2009 | Horvitz |
| 7,840,556 B1 | | 11/2010 | Dayal et al. |

(Continued)

OTHER PUBLICATIONS

U.S. Appl. No. 15/975,683, "Non-Final Office Action", dated Mar. 19, 2020, 16 pages.

(Continued)

*Primary Examiner* — Belix M Ortiz Ditren
(74) *Attorney, Agent, or Firm* — Kilpatrick Townsend & Stockton LLP

(57) ABSTRACT

Systems, devices, and methods of the present invention create a searchable index that includes informative portions of text. In an example, a computer-implemented method creates a discourse tree from a body of text. For each non-terminal node in the discourse tree, the method identifies a rhetorical relationship associated with the non-terminal node. The method labels each terminal node associated with the non-terminal node as either a nucleus or a satellite. The method further accesses a rule associated with the rhetorical relationship, and selects, based on the rule, selects the fragment associated with the nucleus. The method creates a searchable index including the selected fragments.

20 Claims, 19 Drawing Sheets

(56) References Cited

U.S. PATENT DOCUMENTS

| | | | |
|---|---|---|---|
| 9,292,490 | B2 | 3/2016 | Kimelfeld et al. |
| 9,559,993 | B2 | 1/2017 | Palakovich et al. |
| 9,582,501 | B1 | 2/2017 | Salmon et al. |
| 10,019,716 | B1 | 7/2018 | Ainslie et al. |
| 10,599,885 | B2 | 3/2020 | Galitsky |
| 10,679,011 | B2 | 6/2020 | Galitsky |
| 10,839,161 | B2 | 11/2020 | Galitsky |
| 10,949,623 | B2 | 3/2021 | Galitsky |
| 2001/0007987 | A1 | 7/2001 | Igata |
| 2002/0040292 | A1* | 4/2002 | Marcu ............... G06F 40/216 704/4 |
| 2002/0046018 | A1* | 4/2002 | Marcu ............... G06F 40/35 704/9 |
| 2003/0138758 | A1 | 7/2003 | Burstein et al. |
| 2004/0044519 | A1* | 3/2004 | Polanyi ............... G06F 16/345 704/9 |
| 2004/0148170 | A1 | 7/2004 | Acero et al. |
| 2005/0086592 | A1 | 4/2005 | Polanyi et al. |
| 2007/0073533 | A1 | 3/2007 | Thione et al. |
| 2007/0136284 | A1 | 6/2007 | Cobb et al. |
| 2007/0192306 | A1 | 8/2007 | Papakonstantinou et al. |
| 2007/0294229 | A1 | 12/2007 | Au |
| 2008/0228467 | A1 | 9/2008 | Womack et al. |
| 2009/0100053 | A1 | 4/2009 | Boschee et al. |
| 2009/0248399 | A1 | 10/2009 | Au |
| 2010/0169359 | A1 | 7/2010 | Barrett et al. |
| 2011/0119049 | A1 | 5/2011 | Ylonen |
| 2011/0153673 | A1 | 6/2011 | Boschee et al. |
| 2013/0046757 | A1 | 2/2013 | Salvetti et al. |
| 2013/0204611 | A1 | 8/2013 | Tsuchida et al. |
| 2014/0040288 | A1 | 2/2014 | Galitsky |
| 2014/0122083 | A1 | 5/2014 | Xiaojiang |
| 2014/0136188 | A1 | 5/2014 | Wroczynski et al. |
| 2015/0039295 | A1 | 2/2015 | Soschen |
| 2015/0046492 | A1 | 2/2015 | Balachandran |
| 2015/0149461 | A1 | 5/2015 | Aguilar Lemarroy et al. |
| 2015/0161512 | A1 | 6/2015 | Byron et al. |
| 2016/0034457 | A1 | 2/2016 | Bradley et al. |
| 2016/0055240 | A1 | 2/2016 | Tur et al. |
| 2016/0085743 | A1 | 3/2016 | Haley |
| 2016/0086601 | A1 | 3/2016 | Chotimongkol et al. |
| 2016/0232152 | A1 | 8/2016 | Mahamood |
| 2016/0245779 | A1 | 8/2016 | Khalaj Amineh et al. |
| 2016/0246779 | A1 | 8/2016 | Ho et al. |
| 2016/0247068 | A1 | 8/2016 | Lin |
| 2017/0032053 | A1 | 2/2017 | LeTourneau |
| 2017/0116982 | A1 | 4/2017 | Gelfenbeyn et al. |
| 2017/0228368 | A1 | 8/2017 | Carter et al. |
| 2017/0286390 | A1 | 10/2017 | Yashpe et al. |
| 2018/0181648 | A1 | 6/2018 | Chen |
| 2018/0189385 | A1 | 7/2018 | Sun et al. |
| 2018/0314689 | A1 | 11/2018 | Wang et al. |
| 2018/0365228 | A1 | 12/2018 | Galitsky |
| 2019/0005027 | A1 | 1/2019 | He et al. |
| 2019/0057157 | A1 | 2/2019 | Mandal et al. |
| 2019/0103111 | A1 | 4/2019 | Tiwari et al. |
| 2019/0236134 | A1 | 8/2019 | Galitsky |

OTHER PUBLICATIONS

U.S. Appl. No. 15/975,683, "Non-Final Office Action", dated Oct. 31, 2019, 27 pages.

U.S. Appl. No. 15/975,685, "Non-Final Office Action", dated Apr. 1, 2020, 23 pages.

U.S. Appl. No. 15/975,685, "Non-Final Office Action", dated Nov. 15, 2019, 23 pages.

U.S. Appl. No. 16/010,091, "Non-Final Office Action", dated Nov. 18, 2019, 26 pages.

U.S. Appl. No. 16/010,091, "Notice of Allowance", dated Mar. 19, 2020, 13 pages.

U.S. Appl. No. 16/010,141, "Non-Final Office Action", dated Feb. 24, 2020, 12 pages.

U.S. Appl. No. 16/010,156, "Notice of Allowance", dated Feb. 6, 2020, 13 pages.

U.S. Appl. No. 16/010,156, "Notice of Allowance", dated Nov. 7, 2019, 13 pages.

U.S. Appl. No. 16/145,702, "Non-Final Office Action", dated Feb. 5, 2020, 30 pages.

U.S. Appl. No. 16/145,777, "Non-Final Office Action", dated Apr. 3, 2020, 18 pages.

Artooras et al., "Stanford NLP-VP vs NP", Stack Overflow Website, Available online at: https://stackoverflow.com/questions/35872324/stanford-nlp-vp-vs-np/35887762, Mar. 8-9, 2016, 2 pages.

Galitsky et al., "Finding Maximal Common Sub-parse Thickets for Multi-sentence Search", Graph Structures for Knowledge Representation and Reasoning, 2014, pp. 39-57.

Galitsky et al., "Style and Genre Classification by Means of Deep Textual Parsing", Computational Linguistics and Intellectual Technologies: Proceedings of the International Conference "Dialogue 2016", Jun. 2016, pp. 1-45.

Galitsky et al., "Text Classification Based on Deep Textual Parsing", Available online at: http://ceur-ws.org/Vol-1886/paper_8.pdf, 2011, pp. 1-9.

Johnson et al., "The FrameNet Tagset for Frame-Semantic and Syntactic Coding of Predicate-Argument Structure", RightsLink, 2011, pp. 56-62.

Kittredge et al., "An Advanced English Grammar with Exercises", The Athenaeum Press, 1913, 266 pages.

Marcu et al., "An Unsupervised Approach to Recognizing Discourse Relations", Proceedings of the 40th Annual Meeting of the Association for Computational Linguistics (ACL), 2002, 8 pages.

Tai et al., "Improved Semantic Representations from Tree-Structured Long Short-Term Memory Networks", Available Online at: https://arxiv.org/pdf/1503.00075.pdf, May 30, 2015, 11 pages.

International Application No. PCT/US2018/053392, "International Preliminary Report on Patentability", dated Apr. 9, 2020, 7 pages.

U.S. Appl. No. 16/145,702, "Final Office Action", dated Sep. 10, 2019, 25 pages.

Collins et al., "New Ranking Algorithms for Parsing and Tagging: Kernels Over Discrete Structures, and The Voted Perceptron", Proceedings of the 40th Annual Meeting of the Association for Computational Linguistics (ACL), Philadelphia, Jul. 2002, pp. 263-270.

Galitsky et al., "On a Chat Bot Finding Answers with Optimal Rhetoric Representation", RANLP—Recent Advances in Natural Language Processing Meet Deep Learning, Nov. 10, 2017, pp. 253-259.

International Application No. PCT/US2019/031580, "International Search Report and Written Opinion", dated Jul. 5, 2019, 12 pages.

Radev, "A Common Theory of Information Fusion from Multiple Text Sources Step One: Cross-document Structure", Proceedings of the 1st SIGDial Workshop on Discourse and Dialogue, vol. 10, Oct. 7-8, 2000, pp. 74-83.

U.S. Appl. No. 15/975,683, Notice of Allowance, dated Jun. 12, 2020, 17 pages.

U.S. Appl. No. 15/975,685, Notice of Allowance, dated Jul. 24, 2020, 17 pages.

U.S. Appl. No. 16/010,141, Final Office Action, dated Jul. 30, 2020, 14 pages.

U.S. Appl. No. 16/145,702, Final Office Action, dated May 6, 2020, 19 pages.

U.S. Appl. No. 16/145,702, Notice of Allowance, dated Jul. 1, 2020, 15 pages.

U.S. Appl. No. 16/145,777, Notice of Allowance, dated Jul. 15, 2020, 17 pages.

U.S. Appl. No. 16/260,930, Non-Final Office Action, dated Aug. 12, 2020, 9 pages.

U.S. Appl. No. 16/260,939, Non-Final Office Action, dated May 1, 2020, 10 pages.

U.S. Appl. No. 16/260,939, Notice of Allowance, dated Jun. 12, 2020, 14 pages.

Hara et al., "Exploring Difficulties in Parsing Imperatives and Questions", Proceedings of the 5th International Joint Conference on Natural Language Processing, Nov. 8-13, 2011, pp. 749-757.

(56) References Cited

OTHER PUBLICATIONS

International Application No. PCT/US2019/015696, International Preliminary Report on Patentability, dated Aug. 13, 2020, 8 pages.

Chali et al., Complex question answering: unsupervised learning approaches and experiments. J. Artif. Int. Res. 35:1-47, May 2009.

Feng et al., A Linear-Time Bottom-Up Discourse Parser with Constraints and Post-Editing, In Proceedings of the 52nd Annual Meeting of the Association for Computational Linguistics, Jun. 23-25, 2014, pp. 511-521.

Finn, A question writing algorithm Journal of Reading Behavior; 7-4 pp. 341-367, 1975.

Galitsky, Machine Learning of Syntactic Parse Trees for Search and Classification of Text, Engineering Applications of Artificial Intelligence, vol. 26, Issue 3, Mar. 2013, pp. 1072-1091.

Galitsky et al., Rhetoric Map of an Answer to Compound Queries, In Proceedings of the 53rd Annual Meeting of the 20 Association for Computational Linguistics and the 7'h International Joint Conference of Natural Language Processing, Jul. 26-31, 2015, pp. 681-686.

Galitsky, B., Matching parse thickets for open domain question answering, Data & Knowledge Engineering, vol. 107, pp. 24-50, Jan. 2017.

Jansen et al., Discourse Complements Lexical Semantics for Nonfactoid Answer Reranking, In Proceedings of the 52nd Annual Meeting of the Association for Computational Linguistics, Jun. 23-25, 2014, pp. 977-986.

Joty et al., Combining Intra- and Multi-Sentential Rhetorical Parsing for Document-level Discourse Analysis, 51st Annual Meeting of the Association for Computational Linguistics, Aug. 4-9, 2013, pp. 486-496.

Joty et al., Discriminative Reranking of Discourse Parses Using Tree Kernels, Proceedings of the 2014 Conference on Empirical Methods in Natural Language Processing, Oct. 25-29, 2014, pp. 2049-2060.

Kipper et al., A Large-scale Classification of English Verbs, Kluwer Academic Publishers, Springer Netherland, Dec. 2006, 18 pages.

Mann et al., Rhetorical Structure Theory: Towards a Functional Theory of Text Organization, Text-Interdisciplinary Journal for the Study of Discourse, vol. 8, Issue 3, Jan. 1988, pp. 243-281.

Surdeanu et al., Two Practical Rhetorical Structure Theory Parsers, In Proceedings of the Conference of the North American Chapter of the Association for Computational Linguistics—Human Language Technologies, Jun. 5, 2015, pp. 1-5.

Wang et al., Kernel Based Discourse Relation Recognition with Temporal Ordering Information, In Proceedings of the 48'th annual meeting of the Association for Computational Linguistics, Jul. 11-16, 2010, pp. 710-719.

U.S. Appl. No. 16/145,702, "First Action Interview Office Action Summary", dated Apr. 29, 2019, 8 pages.

Galitsky, "Discovering Rhetorical Agreement between a Request and Response", Dialogue & Discourse, vol. 8, No. 2, Dec. 2017, pp. 167-205.

International Application No. PCT/US2019/015696, "International Search Report and Written Opinion", dated Apr. 23, 2019, 12 pages.

Traum, "Rhetorical Relations, Action and Intentionality in Conversation", Proceedings ACL SIG Workshop on Intentionality and Structure in Discourse Relations, Jun. 1993, pp. 132-135.

Exploring Dialog Management for Bots, Chatbots Magazine, Available online at: https://chatbotsmagazine.com/exploring-dialog-management-for-bots-cbb8665a2fd3, Jul. 11, 2016, 7 pages.

Ignore, Deny, Downplay: Accounts of Syrians from Douma Have No Place in Western Narrative, RussiaToday, Available online at: https://www.rt.com/news/425438-douma-witnesses-gas-attack-syria/, Apr. 28, 2018, 8 pages.

Welcome to Apache Lucene, Apache Lucene 7.5.0 and Apache Solr 7.5.0, Available online at: www.lucene.apache.org, Sep. 24, 2018, 38 pages.

De Mori et al., Spoken Language Understanding, IEEE Signal Processing Magazine, vol. 25, No. 3, May 2008, pp. 50-58.

Feng et al., Distributional Footprints of Deceptive Product Reviews, Proceedings of the Sixth International AAAI Conference on Weblogs and Social Media, The AAAI Press, 2012, pp. 98-105.

Feng et al., Syntactic Stylometry for Deception Detection, In ACL 12, Proceedings of the 50th Annual Meeting of the Association for Computational Linguistics, Jul. 8-14, 2012, pp. 171-175.

Fornaciari et al., Identifying Fake Amazon Reviews as Learning from Crowds, In Proceedings of the 14th Conference of the European Chapter of the Association for Computational Linguistics, Apr. 26-30, 2014, pp. 279-287.

Galitsky et al., Concept-Based Learning of Human Behavior for Customer Relationship Management, Information Sciences, vol. 181, No. 10, May 15, 2011, pp. 2016-2035.

Galitsky, Learning Noisy Discourse Trees, Computational Linguistics and Intellectual Technologies, Proceedings of the International Conference "Dialogue 2017", Available online at: http://www.dialog-1.ru/media/3911/galitskyb.pdf, May 31-Jun. 3, 2017, 14 pages.

Hai et al., Deceptive Review Spam Detection via Exploiting Task Relatedness and Unlabeled Data, In Proceedings of the 2016 Conference on Empirical Methods in Natural Language Processing, Nov. 1-5, 2016, pp. 1817-1826.

Makhalova et al., Pattern Structures for News Clustering, In Proceedings of the 4th International Conference on What can FCA do for Artificial Intelligence, vol. 1430, 2015, pp. 35-42.

Mercier et al., Why Do Humans Reason? Arguments for an Argumentative Theory, Behavioral and Brain Sciences, vol. 34, No. 2, Apr. 2011, pp. 57-111.

Mukherjee et al., Fake Review Detection: Classification and Analysis of Real and Pseudo Reviews, Technical Report, Department of Computer Science, 2013, 11 pages.

Mukherjee et al., What Yelp Fake Review Filter Might Be Doing?, In Proceedings of the Seventh International AAAI Conference on Weblogs and Social Media, 2013, pp. 409-418.

International Application No. PCT/US2018/053392, International Search Report and Written Opinion dated Dec. 17, 2018, 11 pages.

Rayana et al., Collective Opinion Spam Detection: Bridging Review Networks and Metadata, In Proceedings of the 21th ACM SIGKDD International Conference on Knowledge Discovery and Data Mining, ACM, Aug. 11-14, 2015, 10 pages.

Salton et al., On the Specification of Term Values in Automatic Indexing, Journal of Documentation, Jun. 1973, 35 pages.

Sjoera, The linguistics Behind Chat Bots, iCapps, Available online at: http://www.icapps.com/the-linguistics-behind-chatbots/, Feb. 22, 2017, 9 pages.

Sun et al., Exploiting Product Related Review Features for Fake Review Detection, Mathematical Problems in Engineering, vol. 2016, Jul. 4, 2016, 7 pages.

Trstenjak et al., KNN with TF-IDF Based Framework for Text Categorization, Procedia Engineering, vol. 69, 24th DAAAM International Symposium on Intelligent Manufacturing and Automation, 2014, pp. 1356-1364.

Van Der Wees et al., Five Shades of Noise: Analyzing Machine Translation Errors in User-Generated Text, Proceedings of the ACL, Workshop on Noisy User-generated Text, Jul. 2015, pp. 28-37.

Wang et al., Using Learning Analytics to Understand the Design of an Intelligent Language Tutor—Chatbot Lucy, (IJACSA) International Journal of Advanced Computer Science and Applications, vol. 4, No. 11, 2013, pp. 124-131.

Yao et al., Online Deception Detection Refueled by Real World Data Collection, In Proceedings of Recent Advances in Natural Language Processing, Jul. 28, 2017, 10 pages.

Ponti, Machine Learning Techniques Applied to Dependency Parsing, University of Pavia, Available Online at, URL: https://vision.unipv.it/AI/AIRG/MachineLearningTechniquesAppliedToDependencyParsingRevised.pdf (Last Accessed Jan. 1, 2019), Oct. 2015, pp. 1-45.

U.S. Appl. No. 16/145,702, First Action Interview Pilot Program Pre-Interview Communication dated Feb. 7, 2019, 6 pages.

Ebrahim, NLP Tutorial Using Python NLTK (Simple Examples), DZone.com, Available Online at, URL: https://dzone.com/articles/nlp-tutorial-using-python-nltk-simple-examples, (Last Accessed Feb. 1, 2019), Sep. 24, 2017, pp. 1-10.

(56) References Cited

OTHER PUBLICATIONS

Chen, Understanding Mental States in Natural Language, Proceedings of the 8th International Conference on Computational Semantics, Jan. 2009, pp. 61-72.

U.S. Appl. No. 16/260,930, Notice of Allowance, dated Dec. 16, 2020, 6 pages.

U.S. Appl. No. 16/010,141, Notice of Allowance dated Sep. 1, 2020, 9 pages.

* cited by examiner

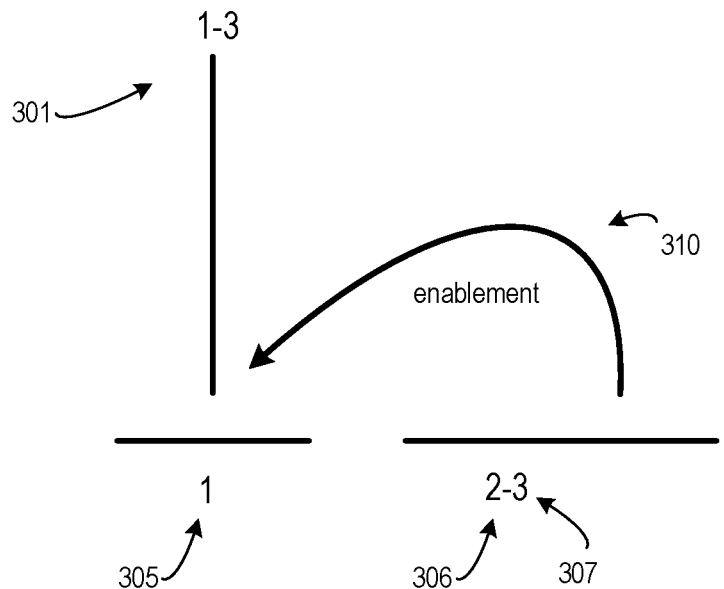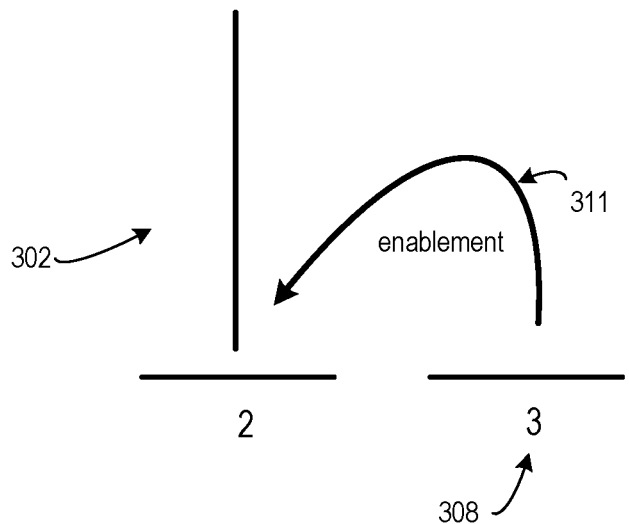
FIG. 3

600

```
(Elaboration[N][S]
    (Elaboration[N][S]
        (Attribution[S][N]
602 ───▶   'Telxon Corp. said'
603 ───▶   (Joint[N][N]
604 ───▶       'its vice president for manufacturing resigned'
               'and its Houston work force has been trimmed by 40 people, or about 15%.'))
        (Attribution[S][N]
            'The maker of hand-held computers and computer systems said'
            (Enablement[N][S]
                'the personnel changes were needed'
                'to improve the efficiency of its manufacturing operation.')))
    (Attribution[S][N]
        'The company said'
        (Elaboration[N][S]
            'it hasn't named a successor to Ronald Bufton, the vice president'
            (Attribution[S][N]
                'who resigned.'
                'its Houston work force now totals 230.'))))
```

FIG. 6

SEARCH INDEXING USING DISCOURSE TREES

CROSS-REFERENCES TO RELATED APPLICATIONS

This application claims the benefit of U.S. Provisional Application No. 62/563,806, filed Sep. 27, 2017, which is incorporated by reference in its entirety.

TECHNICAL FIELD

This disclosure is generally concerned with linguistics. More specifically, this disclosure relates to using communicative discourse trees to improve search indexing.

STATEMENT AS TO RIGHTS TO INVENTIONS MADE UNDER FEDERALLY SPONSORED RESEARCH AND DEVELOPMENT

NOT APPLICABLE

BACKGROUND

Much online content is available via question-answer pairs such as frequently-asked questions stored on customer portals or internal company portals. Question-answer pairs can be an efficient manner to familiarize a user with content. In some cases, autonomous agents (ChatBots) can import such question-answer pairs in order to field user questions.

But such question-answer pairs can contain content that is not central to a topic of an answer. For example, content can include text that is irrelevant or misleading, non-responsive to the particular question, or is neutral and not helpful. If irrelevant text is indexed by a keyword-based search engine, the precision of the search engine is lowered. Moreover, an autonomous agent attempting to answer a user question based on erroneously-indexed text may answer the question incorrectly, resulting in lowered user confidence in the agent.

As such, solutions are needed for identifying informative text from text to be indexed.

BRIEF SUMMARY

Generally, systems, devices, and methods of the present invention use discourse trees to determine informative parts of an answer. In an example, a method accesses a body of text including fragments. The method creates a discourse tree from the body of text. The discourse tree includes nodes. Each nonterminal node represents a rhetorical relationship between two of the fragments. Each terminal node is associated with one or more fragments and is associated with a non-terminal node. The method identifies a rhetorical relationship associated with the non-terminal node for each non-terminal node. The method labels each terminal node associated with the non-terminal node as either a nucleus or a satellite, accesses a rule associated with the rhetorical relationship. The rule specifies accessing a fragment of text associated with one or more of the nucleus or the satellite. The method selects, based on the rule, one or more of the fragment associated with the nucleus or the fragment associated with the satellite. The method creates a searchable index including multiple entries, each entry corresponding to a selected fragment.

In an aspect, each entry can represent a question that can be answered by the body of text or a phrase to be matched to the question.

In an aspect, the rule specifies selecting the fragments associated with a nucleus and discarding fragments associated with a satellite.

In a further aspect, one or more fragments comprise clauses of compound sentences.

In yet another aspect, each rhetorical relationship is one of an elaboration, enablement, condition, contrast, or attribution.

In yet another aspect, the method, for at least one non-terminal node, identifies the rhetorical relationship as either a same unit or a joint relationship and selects both the nucleus and the satellite. The rule specifies accessing both the nucleus and the satellite.

In yet another aspect, the method, for at least one non-terminal node, identifies the rhetorical relationship as an attribution relationship, and responsive to determining that the rhetorical relationship does not represent a query by an author, selects the nucleus.

In yet another aspect, the method creates an index of additional questions by determining, for each entry of the searchable index, an additional question that is answered by the entry. The method receives a query from an external device. The method searches in each of the questions of multiple question-answer pairs, for matches corresponding to the query. The method, responsive to determining that fewer than a threshold number of matches are available, searches, in the index of additional questions, for additional matches to the query. The method, responsive to determining that fewer than a threshold number of additional matches are available in the index of additional questions, searches for further matches in each answers of the plurality of question-answer pairs. The method provides a response to the external device.

In yet another aspect, the method accesses question-answer pairs, each answer includes fragments. The method creates, for each answer, a discourse tree. The discourse tree includes nodes, each nonterminal node representing a rhetorical relationship between two of the fragments and each terminal node is associated with one or more fragments. For each non-terminal node in each answer, the method identifies a rhetorical relationship associated with the non-terminal node. The method labels each terminal node associated with the non-terminal node as either a nucleus or a satellite. The method accesses a rule associated with the rhetorical relationship. The rule specifies accessing a fragment of text associated with either the nucleus or the satellite. The method selects, based on the rule, one or more of the fragment associated with the nucleus or the fragment associated with the satellite. The method creates a searchable index of additional questions, the searchable index including multiple entries, each entry corresponding to one of the selected fragments for the answers.

In yet another aspect, the method receives a query from an external device. The method searches in each of the questions of multiple question-answer pairs, for matches corresponding to the query. The method, responsive to determining that fewer than a threshold number of matches are available, searches in the searchable index of additional questions, for additional matches to the query. The method, responsive to determining that fewer than a threshold number of additional matches are available in the searchable index of additional questions, searches for further matches in each answer of the plurality of question-answer pairs. The method provides a response to the external device.

In yet another aspect, a method trains a classification model to determine text to index. The method accesses a set of training data including a set of training pairs. Each training data pair includes text and an expected classification. The set of training data includes both a first training data pair that has an expected classification of a nucleus and a second training data pair that has an expected classification of a satellite. The method trains a classification model by iteratively providing one of the training data pairs to the classification model, receiving, from the classification model, a determined classification, calculating a loss function by calculating a difference between the determined classification and the expected classification, adjusting internal parameters of the classification model to minimize the loss function.

The above methods can be implemented on tangible computer-readable media and/or operating within a computer processor and attached memory.

BRIEF DESCRIPTION OF THE DRAWINGS

FIG. 3 depicts a further example of a discourse tree in accordance with an aspect.

FIG. 6 depicts an exemplary indented text encoding of the representation in FIG. 5 in accordance with an aspect.

DETAILED DESCRIPTION

Figure 1:
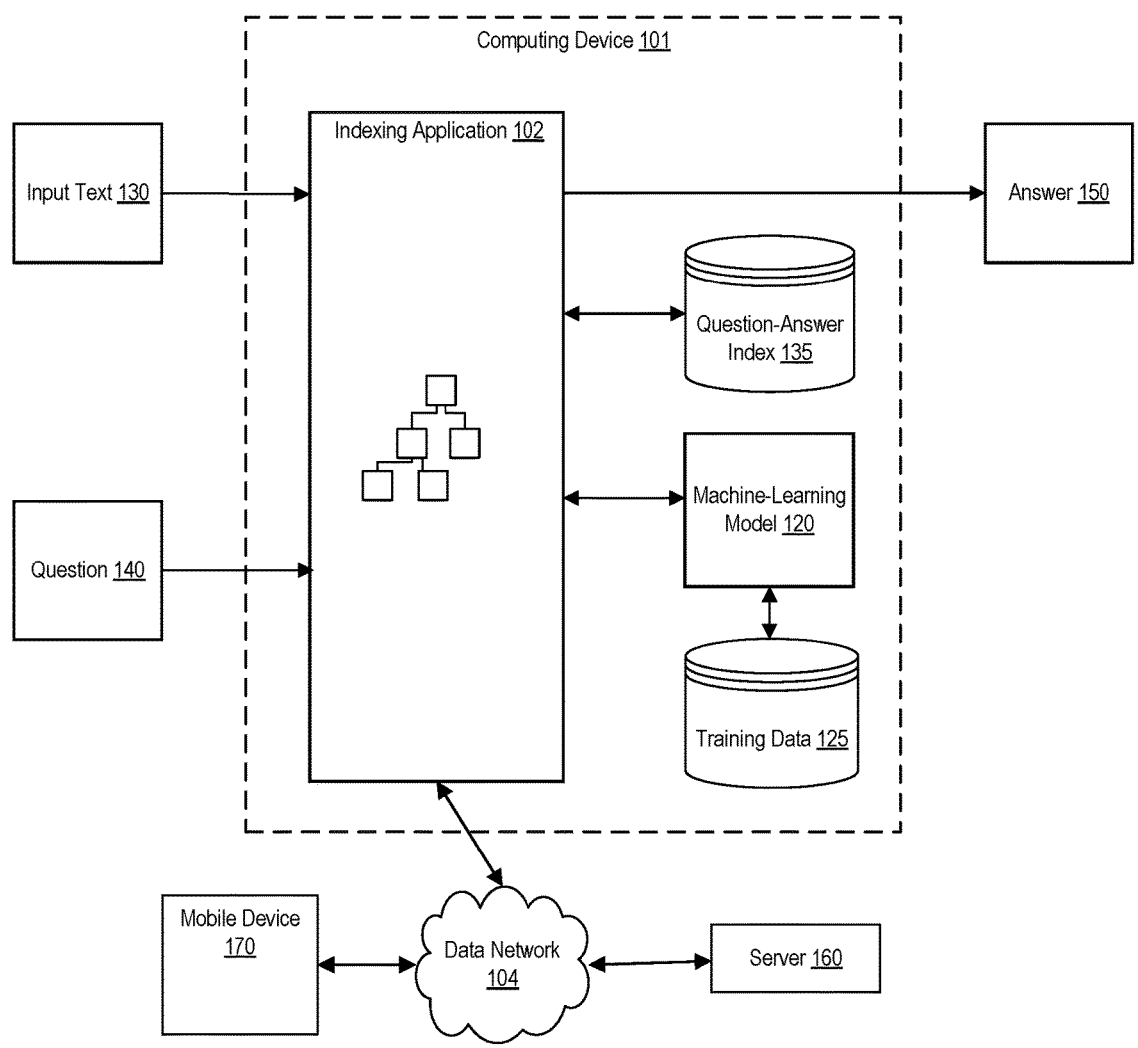
FIG. 1 shows an exemplary rhetoric classification environment in accordance with an aspect.

As discussed above, existing search solutions index entire bodies of text without regard to which parts of the text are informative, thereby causing erroneous results and lower search precision. In contrast, aspects described herein use discourse trees to identify informative fragments of text for indexing. In so doing, certain aspects improve the precision of search engines and autonomous agents that answer questions from users. Precision refers to a fraction of informative instances among retrieved instances.

Other aspects use trained machine learning models to identify informative fragments of text for indexing, permitting the application of sets of rules that dictate which parts of a discourse tree are informative for indexing. Further aspects generate alternative questions from the indexed text that can be answered by the body of text, thereby improving search recall (the fraction of informative instances that have been retrieved of the total amount of informative instances).

Discourse trees originate from Rhetorical Structure Theory (RST). RST models a logical organization of text employed by an author, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences.

The leaves of a discourse tree correspond to EDUs, the contiguous atomic text spans. Adjacent EDUs are connected by coherence relations (e.g., attribution, sequence), forming higher-level discourse units. The leaves of a particular EDU are logically related. This relationship is referred to as the coherence structure of the text. Example relations include elaboration and enablement. As used herein, "nuclearity" refers to which text segment, fragment, or span, is more central to an author's purpose. A "nucleus" refers to a span of text that is more central to an author's purpose than a "satellite," which is less central to an author's purpose. Certain aspects use the determined EDUs of a discourse tree for to a body of text and the relations between the EDUs to determine which EDUs should be indexed for search. Different relations (e.g., elaboration, contrast, etc.) can employ different rules.

The following non-limiting example is provided to introduce certain aspects. An indexing application receives the following text that is a review of a digital camera: "it shoots well in low light, and I made a few good shots on a boat at night." This text would be a good answer for the following questions: "Which camera suits well in low light?," "How to shoot in low light," "low light camera," and "low light conditions." In contrast, this text is not a good answer for search queries such as "good shorts at a boat," "night boat," "boat at night," "good shots," "good boat," or "good night."

Creating a discourse tree for the above compound sentence reveals nucleus "it shoots well in low light," and satellite "I made a few good shots on a boat at night." The nucleus and satellite are related by an "elaboration" relation because the satellite fragment elaborates the nucleus statement. As can be seen with the "elaboration" relationship, the nucleus fragment provides useful information while the satellite fragment does not. In particular, the nucleus phrase is more important text is strongly correlated with the potential question. In contrast, the satellite phrase provides less important details which are less likely to be asked directly. If this less important text is indexed, it might trigger this answer as a response to question on something totally different. Certain aspects use trained machine-learning models to predict which fragments within a body of text should be indexed for search based in part on the type of rhetorical relationship associated with the particular fragment. These aspects train machine learning models to predict informative EDUs to be indexed.

Technical advantages the present disclosure include improved search engine performance (precision, recall) and improved autonomous agents as compared to traditional statistical-based approaches. As discussed, existing keyword-based solutions erroneously index text that is not only non-informative but irrelevant. Considering the above example, existing search techniques may identify words and phrases from the original text such as "boat" or "good shots" as significant, thereby causing a search engine to erroneously index and rely on these phrases.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "index" is a table, data structure, pointer, or other mechanism that links two keywords, data, or parts of text for purposes of data retrieval. For example, an index can include links to keywords, data or parts of text. Index can be a string match or an inverse index.

Turning now to the figures, FIG. 1 shows an exemplary indexing environment in accordance with an aspect. FIG. 1 depicts computing device 101, input text 130, user question 140, answer 150, data network 104, server 160, and mobile device 170. Computing device 101 includes one or more of indexing application 102, question-answer index 135, machine-learning model 120, and training data 125. Computing device 101 can receive text and use discourse trees and/or machine learning models to determine informative parts of text to index, and can use an index to more accurately answer questions received via an autonomous agent.

More specifically, indexing application 102 can determine informative fragments of input text 130, index the determined informative fragments, generate additional questions, generate a question-answer index 135, or generate answer 150 using question-answer index 135.

In an example, indexing application 102 receives a body of input text 130 that is directed to a particular news story with comments. Input text 130 contains multiple sentences that broadly speaking, address the topic of Hurricane "Lane" that made land on Hawaii, but the comments include irrelevant, opinionated, or incorrect statements such as "residents of Hawaii deserve this, who lives on an island?" Indexing application 102 creates a discourse tree from input text 130. The discourse tree includes identification of different fragments of text as nuclei or satellites, some of which are as shown in Table 1 below.

TABLE 1

| Nucleus | Satellite |
| --- | --- |
| Officials also expressed concern about the spread of brush fires. | which they said have already scorched more than 2,000 acres and destroyed several homes. |
| Dozens of residents have been forced to evacuate their homes over the past two days. | wading through waist-high water, and sometimes spreading brush fires, to safety, while thousands of others remain in shelters |
| Federal Emergency Management officials said about 2,000 people remain in shelters. | mostly in Oahu |

Indexing application 102 applies a set of rules that govern whether, for a specific rhetoric relation, a nucleus or a satellite EDUs should be indexed. Indexing application 102 extracts the EDUs (fragments of text) that are informative. Indexing application 102 creates a question for each indexed fragment of text that can be answered by the particular fragment of text. Indexing application creates question-answer index 135, which includes multiple entries. Each entry includes an indexed fragment of text and the corresponding generated question.

Subsequently, indexing application 102 receives a question from a user via a an autonomous agent (ChatBot). The question states "how many people remain in shelters?" Indexing application 102 accesses the question-answer index 135, identifying the corresponding EDU "Federal Emergency Management officials said about 2,000 people remain in shelters." Indexing application 102 provides this answer to the user device.

Mobile device 170 can be any mobile device such as a mobile phone, smart phone, tablet, laptop, smart watch, and the like. Mobile device 170 communicates via data network 104 to server 160 or computing device 101. In this manner, mobile device 170 can provide questions from and output answers to a user, to server 160 or computing device 101. Data network 104 can be any public or private network, wired or wireless network, Wide Area Network, Local Area Network, or the Internet.

In a further aspect, indexing application 102 uses a trained machine-learning model 120 to predict informative parts of fragments to index. An example of machine-learning model 120 is a classification model. Machine-learning model 120 is trained with training data 125, which can include sets of positive-negative training pairs. Positive training pairs include text or text fragments identified as informative for indexing and negative training pairs include text or text fragments identified as not informative.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Relations

As discussed, aspects described herein use rhetorical relations and discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible. Table 2 below lists different rhetorical relations.

TABLE 2

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |

TABLE 2-continued

| Relation Name | Nucleus | Satellite |
| --- | --- | --- |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown in Table 3 below.

TABLE 3

| Relation Name | Span | Other Span |
| --- | --- | --- |
| Contrast | One alternate | The other alternate |
| Joint | (unconstrained) | (unconstrained) |
| List | An item | A next item |
| Sequence | An item | A next item |

Figure 2:
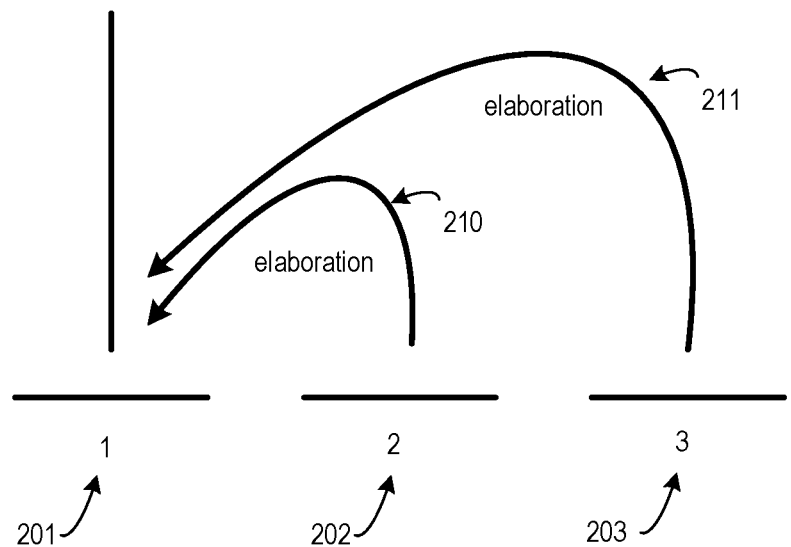
FIG. 2 depicts an example of a discourse tree in accordance with an aspect.

FIG. 2 depicts an example of a discourse tree in accordance with an aspect. FIG. 2 includes discourse tree 200. Discourse tree includes text span 201, text span 202, text span 203, relation 210 and relation 211. The numbers in FIG. 2 correspond to the three text spans. FIG. 3 corresponds to the following example text with three text spans numbered 1, 2, 3:

1. Honolulu, Hawaii will be site of the 2017 Conference on Hawaiian History

2. It is expected that 200 historians from the U.S. and Asia will attend

3. The conference will be concerned with how the Polynesians sailed to Hawaii

For example, relation 210, or elaboration, describes the relationship between text span 201 and text span 202. Relation 210 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 311. Relation 310 depicts relation 310, enablement, between components 306 and 305, and 307, and 305. FIG. 3 refers to the following text spans:

1. The new Tech Report abstracts are now in the journal area of the library near the abridged dictionary.

2. Please sign your name by any means that you would be interested in seeing.

3. Last day for sign-ups is 31 May.

As can be seen, relation 310 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
(a) Unit size may vary, depending on the goals of the analysis
(b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
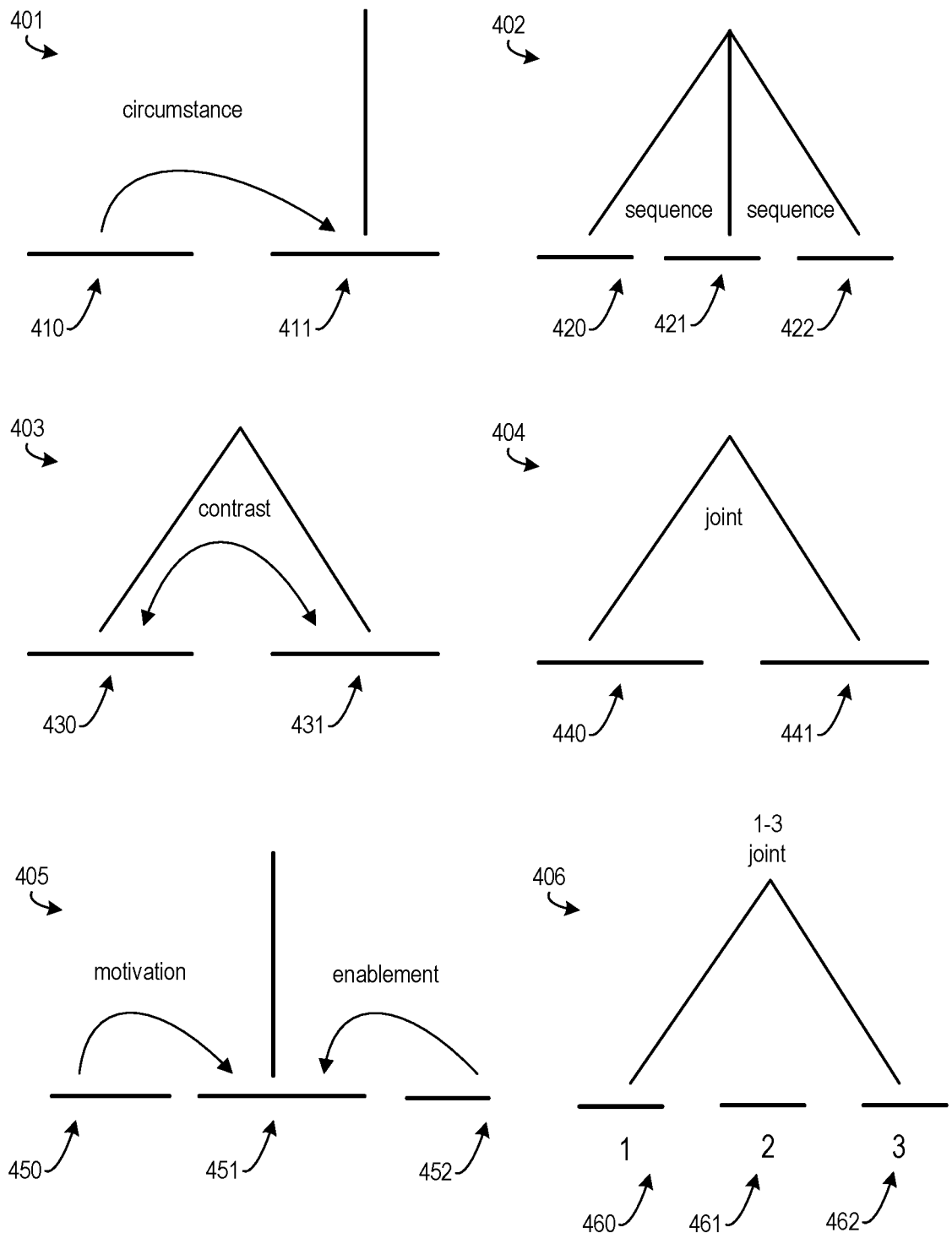
FIG. 4 depicts illustrative schemas in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas in accordance with an aspect. FIG. 4 shows a joint schema is a list of items consisting of nuclei with no satellites. FIG. 4 depicts schemas 401-406. Schema 401 depicts a circumstance relation between text spans 410 and 411. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
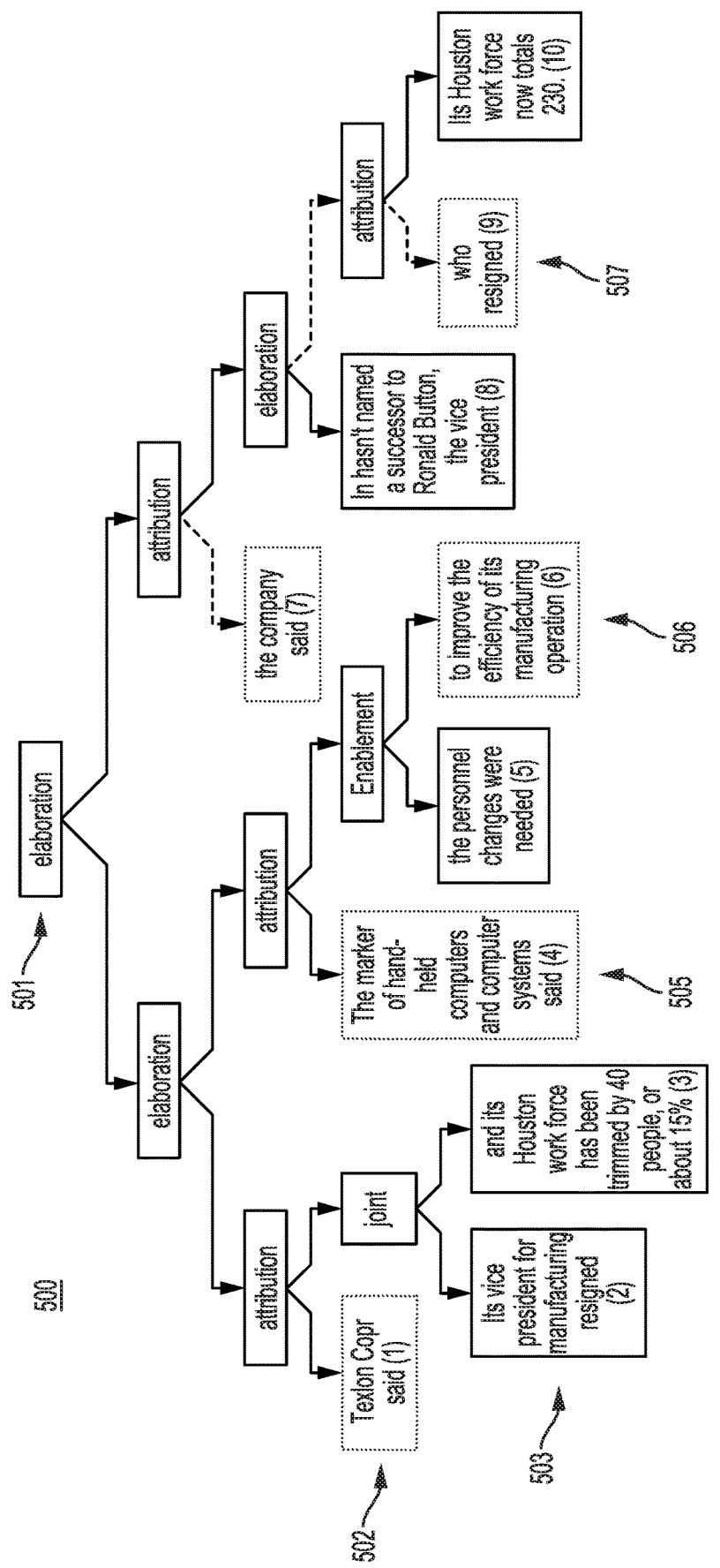
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution...) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra-and multi-sentential rhetorical parsing for document-level discourse analysis. In ACL (1), pages 486-496.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of informative instances among the retrieved instances, while recall (also known as sensitivity) is the fraction of informative instances that have been retrieved over the total amount of informative instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is ⅝ while its recall is 5/12. When a search engine returns 30 pages only 20 of which were informative while failing to return 40 additional informative pages, its precision is 20/30=⅔ while its recall is 20/60=⅓. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Analyzing Request and Response Pairs

Figure 7:
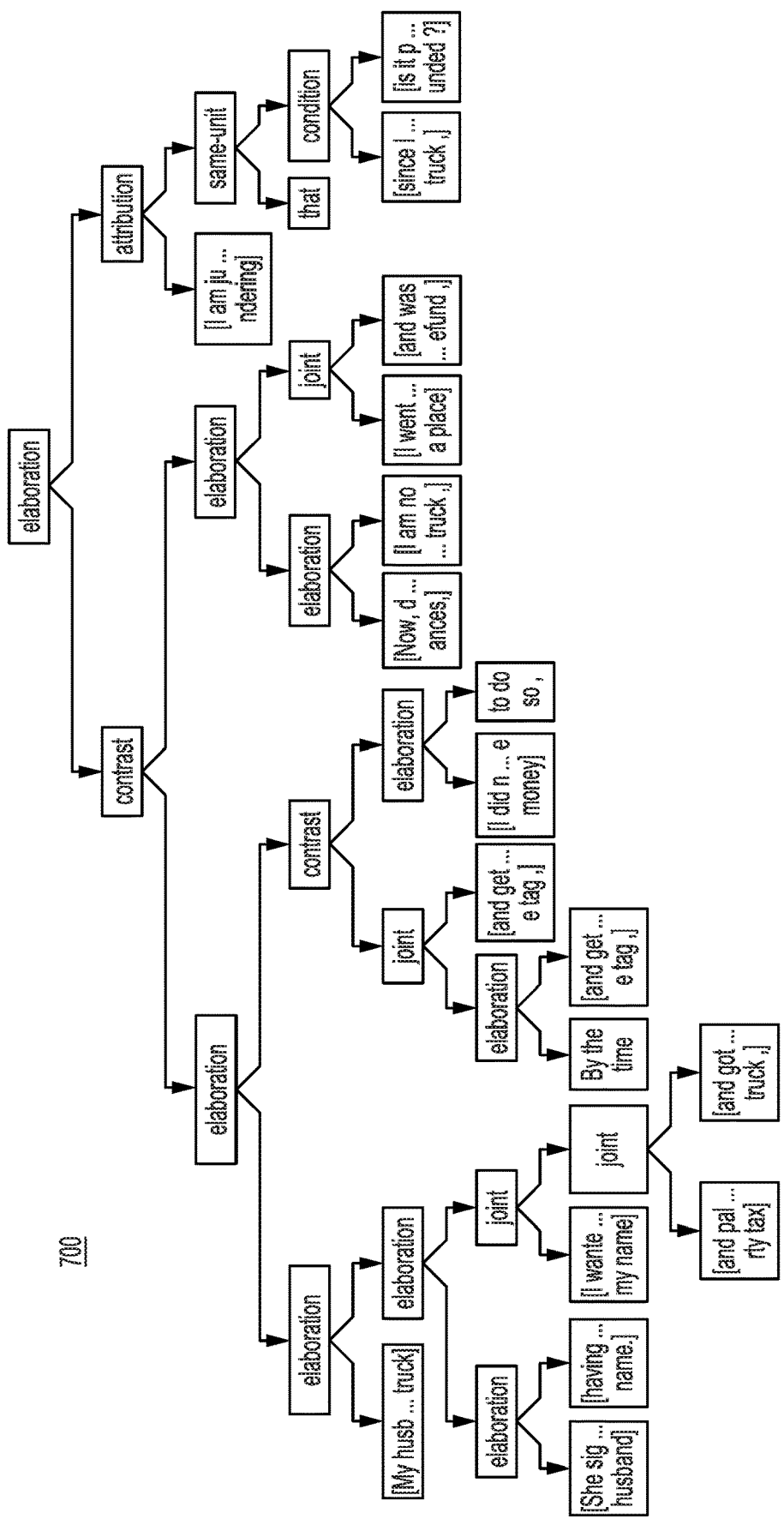
FIG. 7 depicts an exemplary discourse tree for an example request about property tax in accordance with an aspect.

FIG. 7 depicts an exemplary discourse tree for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with [0097] "By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
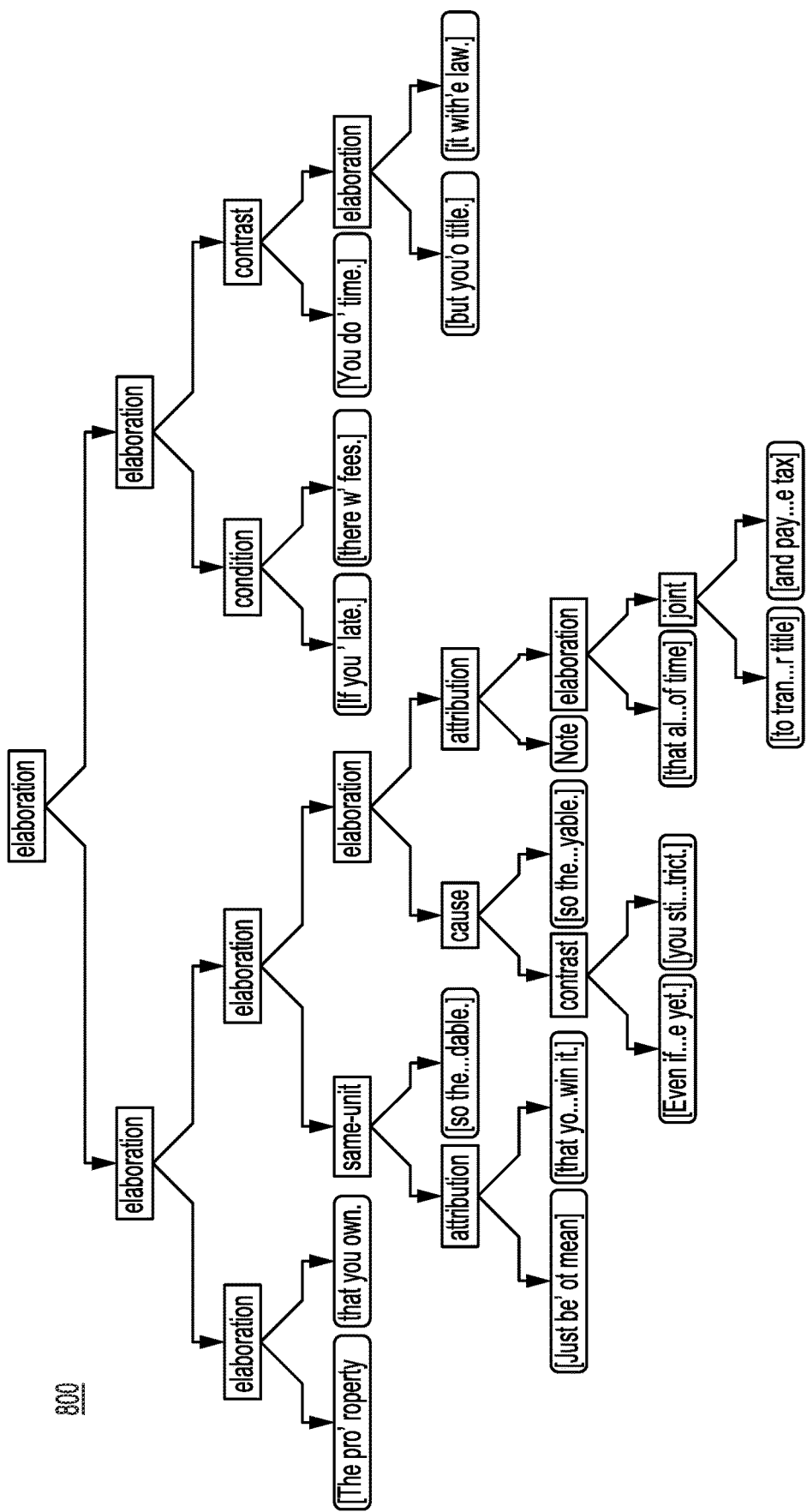
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
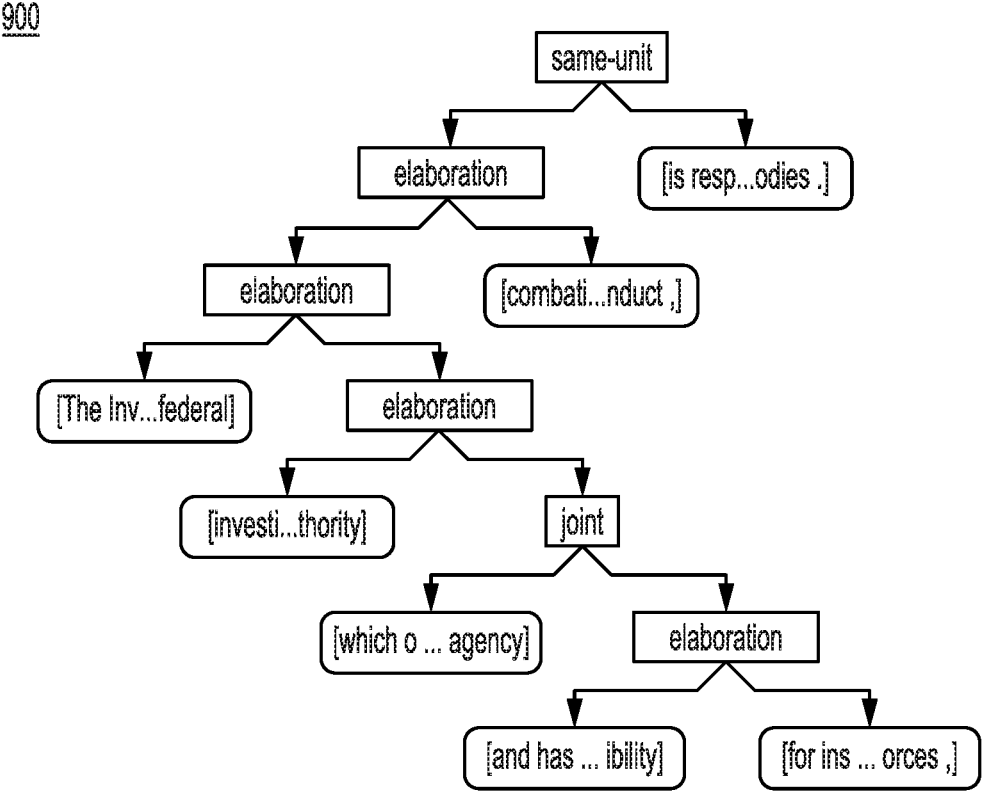
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
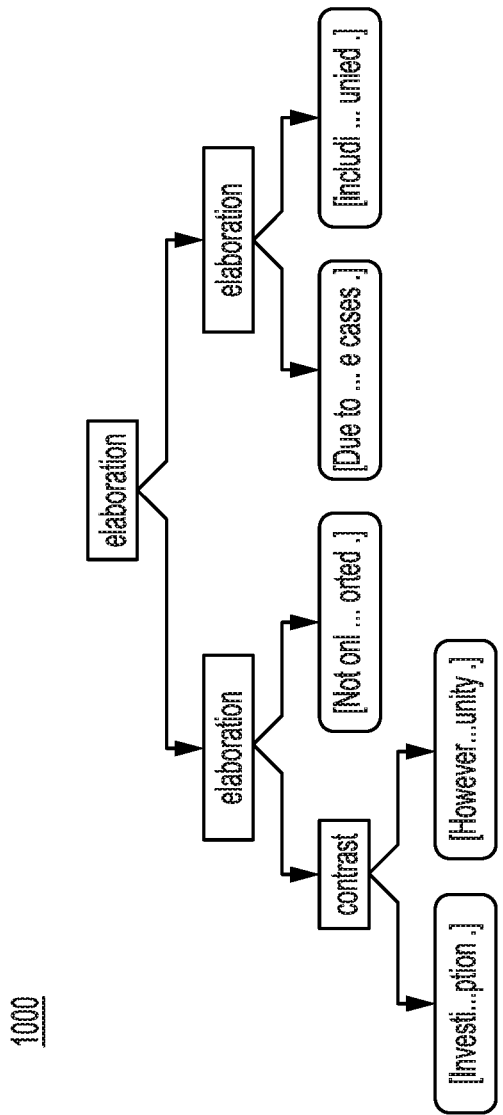
FIG. 10 illustrates a discourse tree for a raw answer in accordance with an aspect.

FIG. 10 illustrates a discourse tree 1000 for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIGS. 9 and 10). Sometimes, the question itself can give a hint about which category of answers is expected. If a question is formulated as a factoid or definitional one, without a second meaning, then the first category of answers is suitable. Otherwise, if a question has the meaning "tell me what it really is," then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Using Discourse Trees to Determine Informative Text for Indexing

As discussed, certain aspects use discourse trees to determine informative portions of text to index. This approach increases the amount of text that is informative in answers to questions provided by search engines or autonomous agents and facilitates the generation of additional questions that can be answered by a body of text, thereby making the text more accessible via question answering. Certain aspects are described with respect to FIG. 11 for example purposes.

Figure 11:
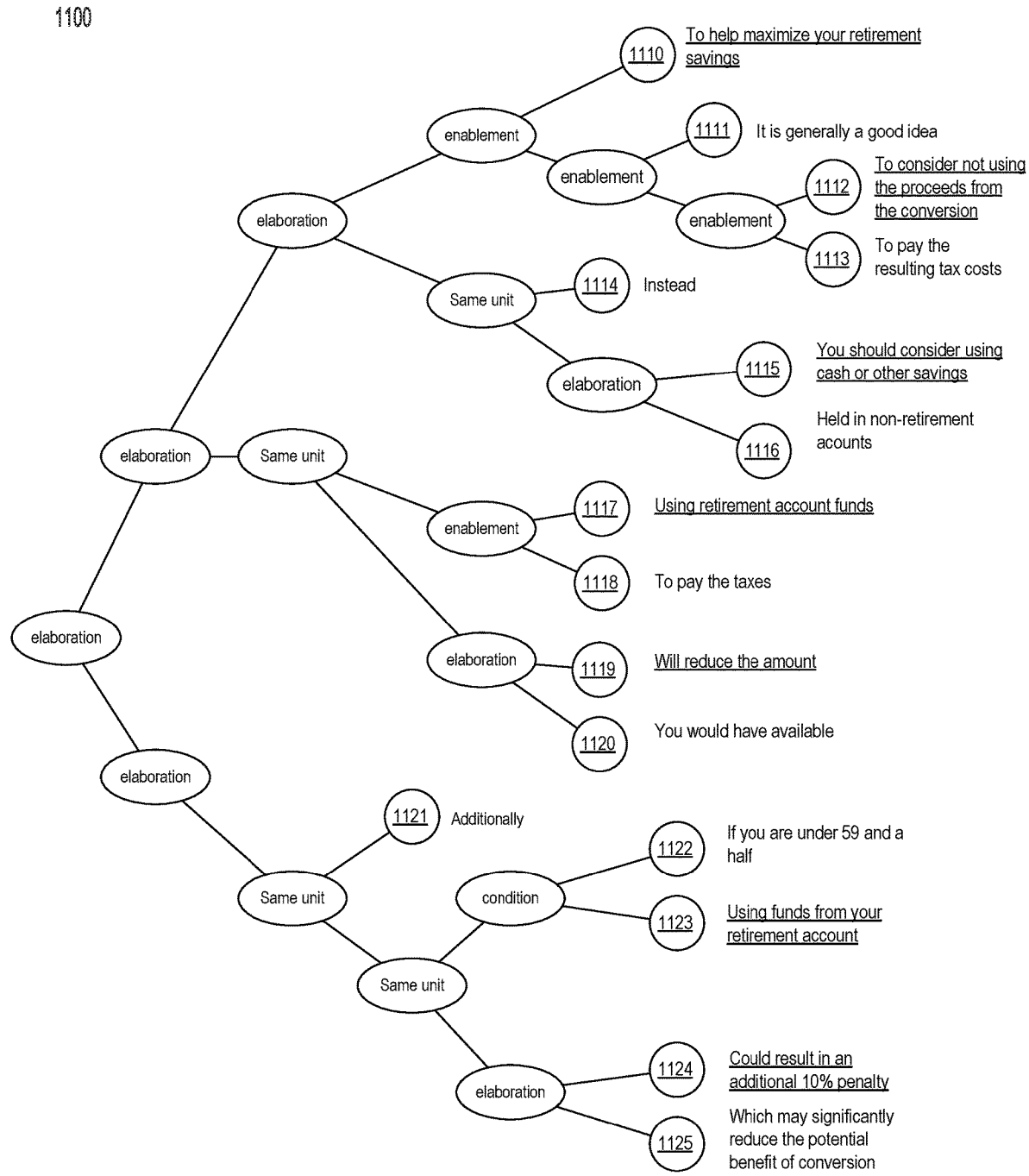
FIG. 11 illustrates a discourse tree for an example of an answer to a question, in accordance with an aspect.

FIG. 11 illustrates a discourse tree for an example of an answer to a question, in accordance with an aspect. FIG. 11 illustrates discourse tree 1100, which represents an answer to the following question: "How should I plan to pay for taxes resulting from converting to a Roth IRA?" FIG. 11 also depicts elementary discourse units corresponding to fragments of the text as terminal nodes 1110-1125.

The answer corresponding to discourse tree 100 is: "[t]o help maximize your retirement savings, it's generally a good idea to consider not using the proceeds from the conversion to pay the resulting tax costs. Instead, you should consider using cash or other savings held in nonretirement accounts. Using retirement account funds to pay the taxes will reduce the amount you would have available to potentially grow tax-free in your new Roth IRA. Additionally, if you are under 59½, using funds from your retirement account could result in an additional 10% tax penalty, which may significantly reduce the potential benefit of conversion."

The answer could be obtained from a source such as a Frequently Asked Questions (FAQ) database or a question-answer index. A question-answer index can include multiple questions and corresponding answers. But as further explained, some fragments in each answer are more informative to answering a question than other fragments. For example, the phrase "it is generally a good idea" adds little to the answer, whereas "consider not using the proceeds from the conversion" is informative to the user who posed the original question.

Additionally, each answer in the question-answer index may provide additional questions that can be answered, which are in turn indexed, increasing the usefulness of the data. For example, "at what age do I pay a penalty for using retirement funds?" could be answered by the text (e.g., "age 59½"). Certain aspects can determine informative text from a body of text and such additional questions that can be answered from the body of text.

The nodes selected for indexing are nodes 1110, 1112, 1115, 1117, 1119, 1123, and 1124 (shown with underlining). A general rule is that the EDUs representing nuclei should be indexed, and the EDUs representing satellites is discarded.

As depicted, a node that is the first, or upper, of two related nodes is a nucleus. The node that is the second, or lower, of two related nodes, is the satellite. Note that in a conditional relation, the "if" EDU is the satellite. For example, phrases from the nucleus elementary discourse units and their respective nodes are:

help maximize your retirement savings (Node 1110)
proceeds from the conversion (Node 1112)
cash or other savings held in nonretirement accounts (Node 1115)
retirement account funds; (Node 1117)
using funds from your retirement account (Node 1123)
result in an additional 10% tax penalty (Node 1124)
The satellite EDU expressions are:
it's generally a good idea (Node 1111)
pay the resulting tax costs (Node 1118)
held in nonretirement accounts (Node 1116)
to pay the taxes (Node 1118)
you would have available to potentially (Node 1120)
if you are under 59½ . . . (Node 1122)

It can be seen that generally speaking the nodes of terminal nodes 1100-1125 that are identified as nuclei are directly informative to the topic of the answer and therefore should be indexed. In contrast, the satellite nodes for a particular rhetorical relationship are not informative to the question and therefore should not be indexed. For example, the phrase "it is generally a good idea" (node 1111) is not related to finance. The phrase "pay the resulting tax costs" (node 1118) is detached from the context of the question, as is "held in nonretirement accounts" (node 1116). Additionally, "you would have available to potentially" (node 1120) is a counterfactual question that is unlikely to occur in a user question. Finally, "if you are under 59½" (node 1122) is a condition that is not necessary directly queried.

The above hypothesis that only EDUs that are nucleus of rhetoric relations should be indexed and all satellite EDUs should not be selected for indexing is illustrated by the "elaboration" relationship. In the elaboration relationship, the nucleus expresses more important information than satellite. A satellite may express a detail of information being communicated that is unlikely to be cited by a user query. For example, nodes 1124 and 1125 are related by an elaboration relationship. A can be seen, "could result in an additional 10% penalty" is more important than "which may significantly reduce the potential benefit of conversion." Accordingly, the satellite fragments of text should not be matched with a potential question to deliver this particular answer.

Different Rhetoric Relations

But the general rule described above can be subject to certain exceptions. For example, under certain conditions, the "contrast" and "attribution" relations can require indexing of the satellite rather than the nucleus. Additionally, for the "same-unit" and "joint" relations, both the nucleus and the satellite are indexed. Different rhetoric relations can have different rules, as shown in Table 4 below:

At block 1201, process 1200 involves accessing a body of text including fragments. Examples of bodies of text are user utterances, online content, stored electronic content, and scanned documents. Text can include question/answer pairs. In an example, indexing application 102 accesses the text associated with discourse tree 1100.

At block 1202, process 1200 involves creating a discourse tree from the body of text. Creating a discourse tree involves determining elementary discourse units and the rhetorical relations between each pair of elementary discourse units. The discourse tree includes nodes, each nonterminal node representing a rhetorical relationship between two of the fragments, and each terminal node is associated with one or more fragments and is associated with a non-terminal node. Continuing the example, indexing application 102 creates discourse tree 1100. Any discourse tree parser can be used.

At block 1203, process 1200 involves identifying a rhetorical relationship for each non-terminal node. The rhetorical relationship indicates the relationship of the two child nodes, which can be terminal nodes, or other non-terminal nodes. Continuing the example, indexing application 102 identifies various rhetorical relations as illustrated in FIG. 11 such as elaboration, same unit, enablement, etc. Each terminal node 1100-1125 is associated with a rhetorical relation. For example, indexing application 102 identifies nodes 1112 and 1113 as related by an enablement relation.

At block 1204, process 1200 involves labeling each terminal node associated with a non-terminal node as a nucleus or a satellite. Using Rhetorical Structure Theory, indexing application 102 labels each terminal node as a nucleus or a satellite.

At block 1205, process 1200 involves accessing a rule associated with the rhetorical relationship. The rule specifies

TABLE 4

| Relation | Example | Indexing rule |
|---|---|---|
| Elaboration | To achieve some state [nucleus] ¦ do this and that [satellite] | Nucleus |
| Enablement | A query may be of the form "how to achieve some state?" but less likely be of the form "what can I achieve doing this and that?". | Nucleus |
| Condition | A query may be of the form "how to achieve some state?" but less likely be of the form "what can I achieve doing this and that?". | When the question is of the type "when/where/under what condition . . .", index the if part (the satellite) |
| Contrast | | Index the nucleus. The satellite includes facts which are unusual, unexpected, unanticipated. |
| Attribution | | General rule: index the nucleus (may occur in a factoid question). Do not index the satellite part on whom the factoid is attributed (as it is usually a minor detail). Exception: a query by an author. In this case, such queries texts should be transformed into a structured way and covered by a different kind of search technology. |
| Same-Unit | | Index both nucleus and satellite because of the symmetric relationship of same-unit. |
| Joint | | Index both nucleus and satellite because of the symmetric relationship of joint. |

Figure 12:
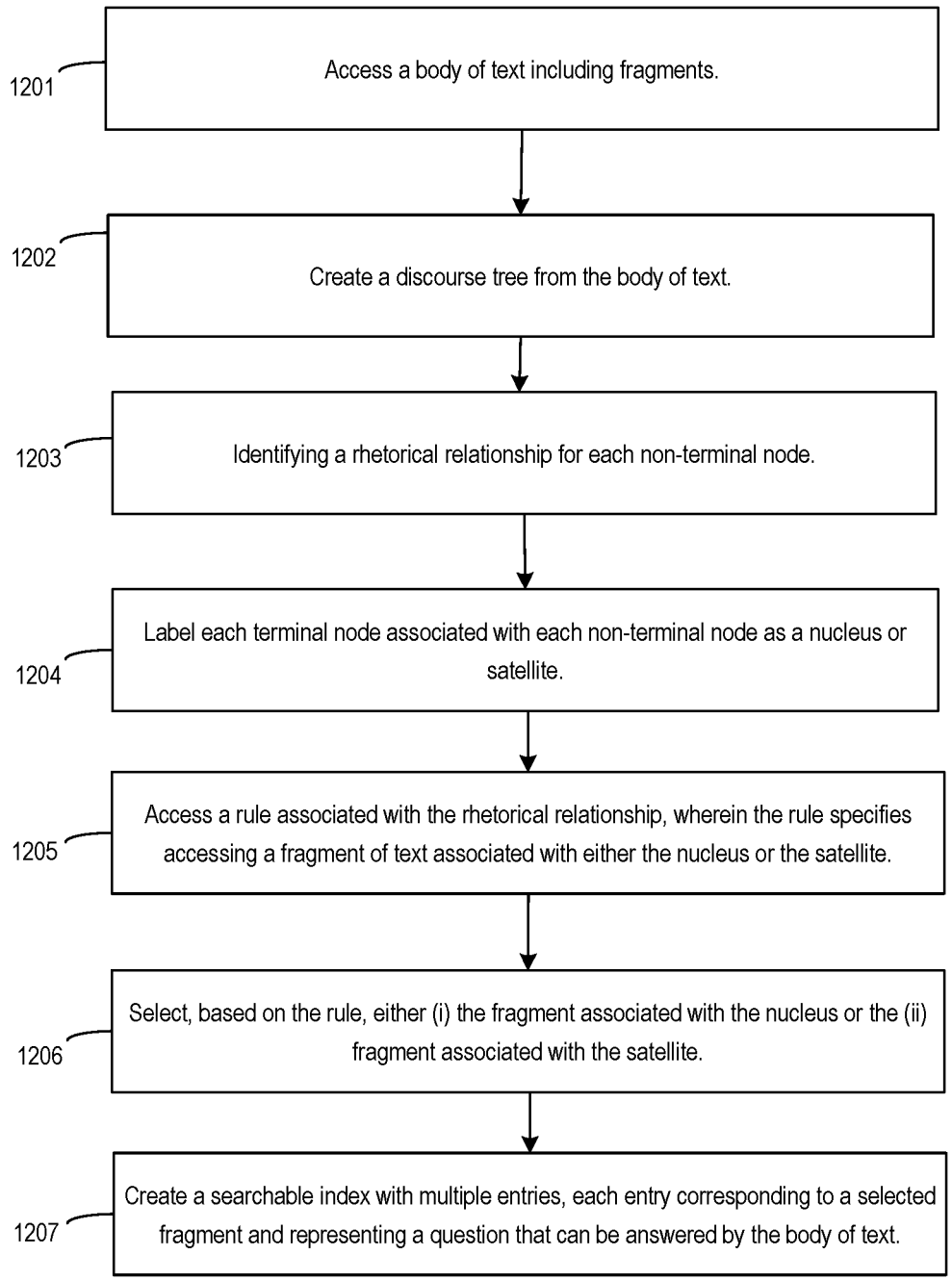
FIG. 12 depicts a flowchart illustrating an example of a process for determining informative text for indexing, in accordance with an aspect.

FIG. 12 depicts a flowchart illustrating an example of a process for determining informative text for indexing, in accordance with an aspect. FIG. 12 is discussed with respect to FIG. 11 for example purposes.

accessing a fragment of text associated with either the nucleus or the satellite. Continuing the example, indexing application 102 accesses a rule for enablement. As described in Table 4, for EDUs associated with enablement, the nucleus is indexed. Indexing application 102 continues block 1204 for each rhetorical relation.

At block 1206, process 1200 involves selecting, based on the rule, either (i) the fragment associated with the nucleus or the (ii) fragment associated with the satellite. Using the rule identified at block 1204, indexing application 102 selects the nucleus, node 1112, for indexing. Indexing application 102 continues block 1205 for each rhetorical relation.

At block 1207, process 1200 involves creating a searchable index with multiple entries, each entry corresponding to a selected fragment and representing a question that can be answered by the body of text. Continuing the example, indexing application 102 creates a searchable index with all selected elementary discourse units gathered during block 1205. Specifically, indexing application 102 gathers nodes 1110, 1112, 1115, 1117, 1119, 1123, and 1124. In some cases, indexing application 102 determines a question that can be answered by each indexed EDU and stores the question along with the indexed text in question-answer index 135.

Building Additional Questions from Indexed Text

Indexing application 102 can use a multi-tiered approach to answering questions or queries. For example, indexing application 102 can use the question-answer index 135 (e.g., a Frequently-Asked Question database) or the entirety of the text from which question-answer index 135 was constructed. In the example that follows, indexing application 102 can first check question-answer index 135 for a suitable match, then check the list of alternative questions, i.e., the searchable index determined by process 1200, then search all of the answers in question-answer index 135.

Figure 13:
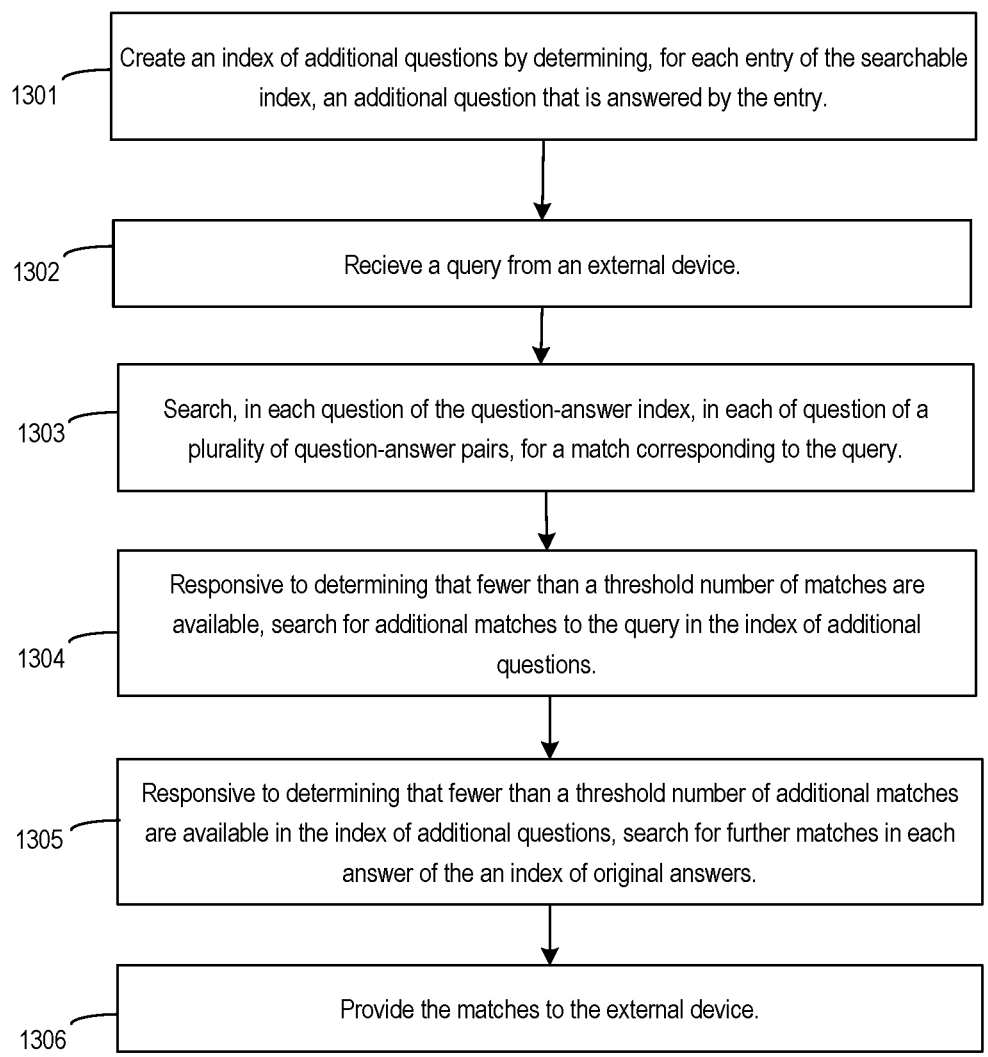
FIG. 13 depicts a flowchart illustrating an example of a process for responding to searches, in accordance with an aspect.

FIG. 13 depicts a flowchart illustrating an example of a process for responding to searches, in accordance with an aspect. FIG. 13 can use question-answer index 135, a searchable index that comprises informative fragments of text determined by process 1200, or another previously-indexed text.

At block 1301, process 1300 involves creating an index of additional questions by determining, for each entry of the searchable index, an additional question that is answered by the entry. Different methods can be used to determine questions from a particular informative fragment of text.

In an example, indexing application 102 receives an arbitrary sentence and outputs a set of questions. Indexing application 102 builds a parse tree. Indexing application 102 selects nodes of the parse tree that represent nouns, verbs, and adjectives. Next, for each selected node, indexing application 102 forms a reduction of a parse tree by removing the particular node. Indexing application 102 builds a question for the reduction by substituting a Wh word (what, who, where, whose, why, etc.) for the removed node. Indexing application 102 selects a proper Wh word following a set of rules. In an example, rules include substituting "who" or "what" for a noun, "what . . . do," and "which way" or "how is" for an adjective.

Figure 14:
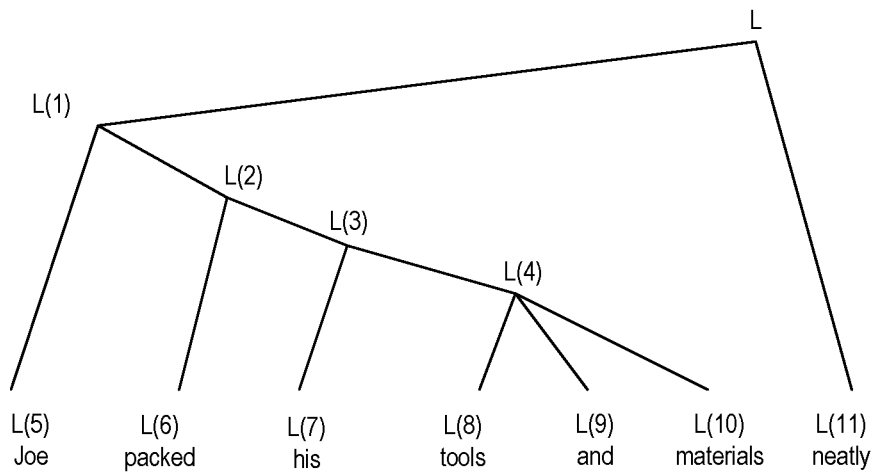
FIG. 14 depicts a parse tree for a sentence used to illustrate forming a question from text, in accordance with an aspect.

FIG. 14 depicts a parse tree for a sentence used to illustrate forming a question from text, in accordance with an aspect. FIG. 14 depicts a parse tree 1400 for the sentence "Joe packed his tools and materials neatly." As depicted, parse tree 1400 includes 11 nodes, 7 of which are terminal nodes. Table 5 below illustrates questions generated by deleting odd-numbered nodes in the sentence using the method described.

TABLE 5

| Node deleted | Question Generated |
| --- | --- |
| 3 | What did Joe pack neatly? |
| 5 | Who packed his tools and materials neatly? |
| 7 | Whose tools and materials did Joe pack neatly? |
| 9 | No question: Structure words are not deleted. |
| 11 | How did Joe pack his tools and materials? |

Returning to FIG. 13, at block 1302, process 1300 involves receiving a query from an external device such as mobile device 170. A query can be an input to an autonomous agent (ChatBot), or a search provided by a user.

At block 1303, process 1300 involves searching, in each question of the question-answer index for a match corresponding to the query. The question-answer pairs can be a FAQ, e.g., with a question and corresponding answer.

At block 1304, process 1300 involves responsive to determining that fewer than a threshold number of matches are available, searching for additional matches to the query in the index of additional questions. The searchable index can be generated, for example, by process 1200. By using the searchable index that contains only text fragments informative to the answer, indexing application 102 need not parse through and potentially output less-informative text to the question.

Continuing the example, index application 102 determines that less than a threshold number of matches to the query are available in the index of additional questions. Example thresholds are a percentage of the total available questions, a predetermined number, or a number of questions determined by a particular domain, subject, or system configuration. In response, indexing application 102 searches the question-answer index 135.

At block 1305, process 1300 involves, responsive to determining that fewer than a threshold number of additional matches are available in the index of additional questions, searching for further matches in each answer of the an index of original answers. The threshold used at block 1305 can be different from the threshold used at block 1304. Continuing the example, indexing application 102 searches for a match in each answer of the question-answer index.

At block 1306, process 1300 involves providing the response to the external device. Example external devices include mobile device 170 or remote devices connected across data network 104. Alternatively, indexing application 102 can provide the answer directly to a user.

Autonomous Agents

As discussed, certain aspects described herein enable improved autonomous agents (ChatBots). A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A ChatBot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turing test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the ChatBot being human-like and a computer combined.

For example, users can interact with the Intelligent Bots Platform through a conversational interaction. This interaction, also called the conversational user interface (UI), is a dialog between the end user and the ChatBot, just as between two human beings. It could be as simple as the end user saying "Hello" to the ChatBot and the ChatBot responding with a "Hi" and asking the user how it can help, or it could be a transactional interaction in a banking ChatBot, such as transferring money from one account to the other, or an informational interaction in a HR ChatBot, such as checking for vacation balance, or asking an FAQ in a retail ChatBot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the ChatBot, these are mapped that to a specific and discrete use case or unit of work, for e.g. check balance, transfer money and track spending are all "use cases" that the ChatBot should support and be able to work out which unit of work should be triggered from the free text entry that the end user types in a natural language.

The underlying rational for having a ChatBot respond like a human is that the human brain can formulate and understand the request and then give a good response to the human request much better than a machine. Thus, there should be significant improvement in the request/response of a ChatBot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the intern& or intranet or other publically/privately available data sources.

Figure 15:
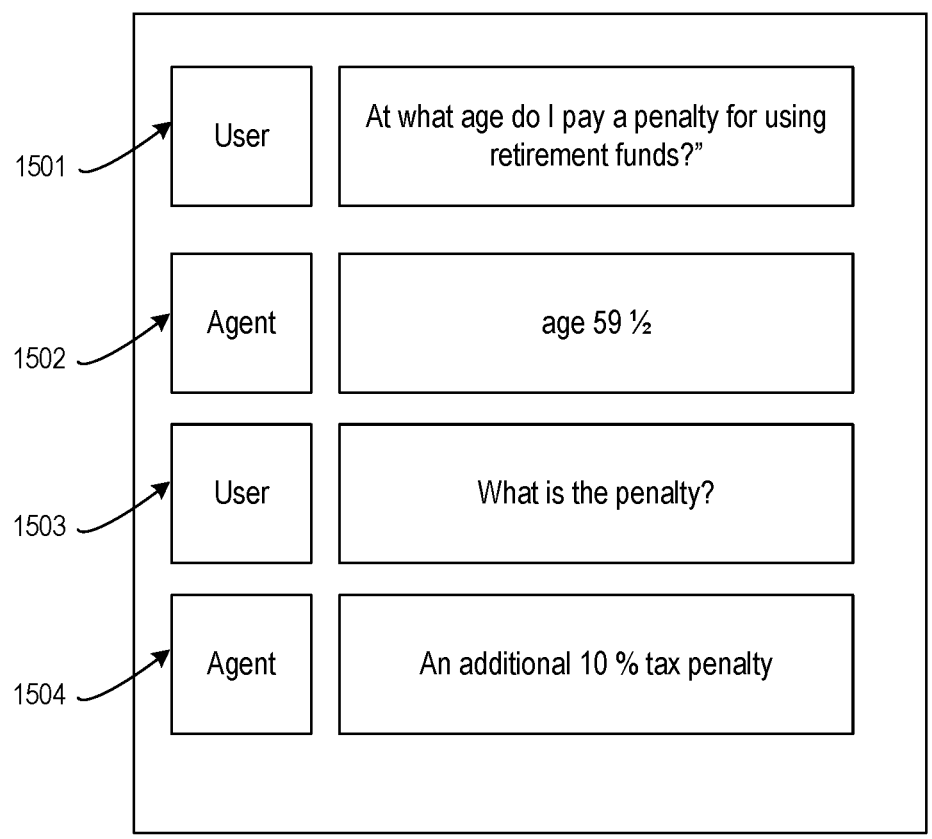
FIG. 15 illustrates an autonomous agent answering user questions in accordance with an aspect.

FIG. 15 illustrates an autonomous agent answering user questions in accordance with an aspect. FIG. 15 depicts chat 1500, user messages 1501 and 1503, and agent responses 1502 and 1504. Agent responses 1502 and 1504 can be provided by indexing application 102. As depicted, the user message 1501 asks "at what age do I normally pay a penalty for using retirement funds?" Indexing application 102 identifies the answer from the body of text indexed using process 1200 and provides agent response 1502, which states "age 59½." User asks a follow on question 1503 "What is the penalty?" In response, the agent answers "An additional 10% tax penalty."

The features depicted in FIG. 15 can be implemented by computing device 101 or by indexing application 102.

Using Classifiers to Determine Text for Indexing

Certain aspects use machine learning models to learn rules such as those depicted in Table 4. A machine learning problem can be formulated as a classification problem that classifies EDUs into a first class that is suitable for indexing (i.e., informative) and forming alternative questions for an answer and a second class that is not suitable for indexing (i.e., not informative).

In an example, a training data set is formed by using text gathered from a search engine. For example, search answer popularity, or search rank, can be learned by a search engine on the basis of a high number of searches for the same query and user selection.

To accumulate question-answer pairs with marked answers, a selection of queries against short texts can be run. The portions of these texts that are used for matching can be identified. Because longer queries are necessary to assure a corresponding match is nontrivial, public question-answer pages such as Yahoo! Answers datasets can be used. More specifically, questions from such datasets can be formed from a first sentence of the dataset. In an example, Microsoft Cognitive Services (Bing Search engine API) can execute these queries. Search results which are short texts (4-6 sentences) are selected as such texts suitable for parsing and discourse analysis.

Matched fragments of these texts are taken as elements of the training set. Such fragments from the top ten or more pages of search result forms a positive dataset, i.e. informative fragments. It includes the fragments of texts considered by the search engine to be of high relevance. For the negative dataset, fragments with matched keywords from the set of lower ranked (100-1000+) search results pages are taken, as these results are assumed to be less relevant.

Figure 16:
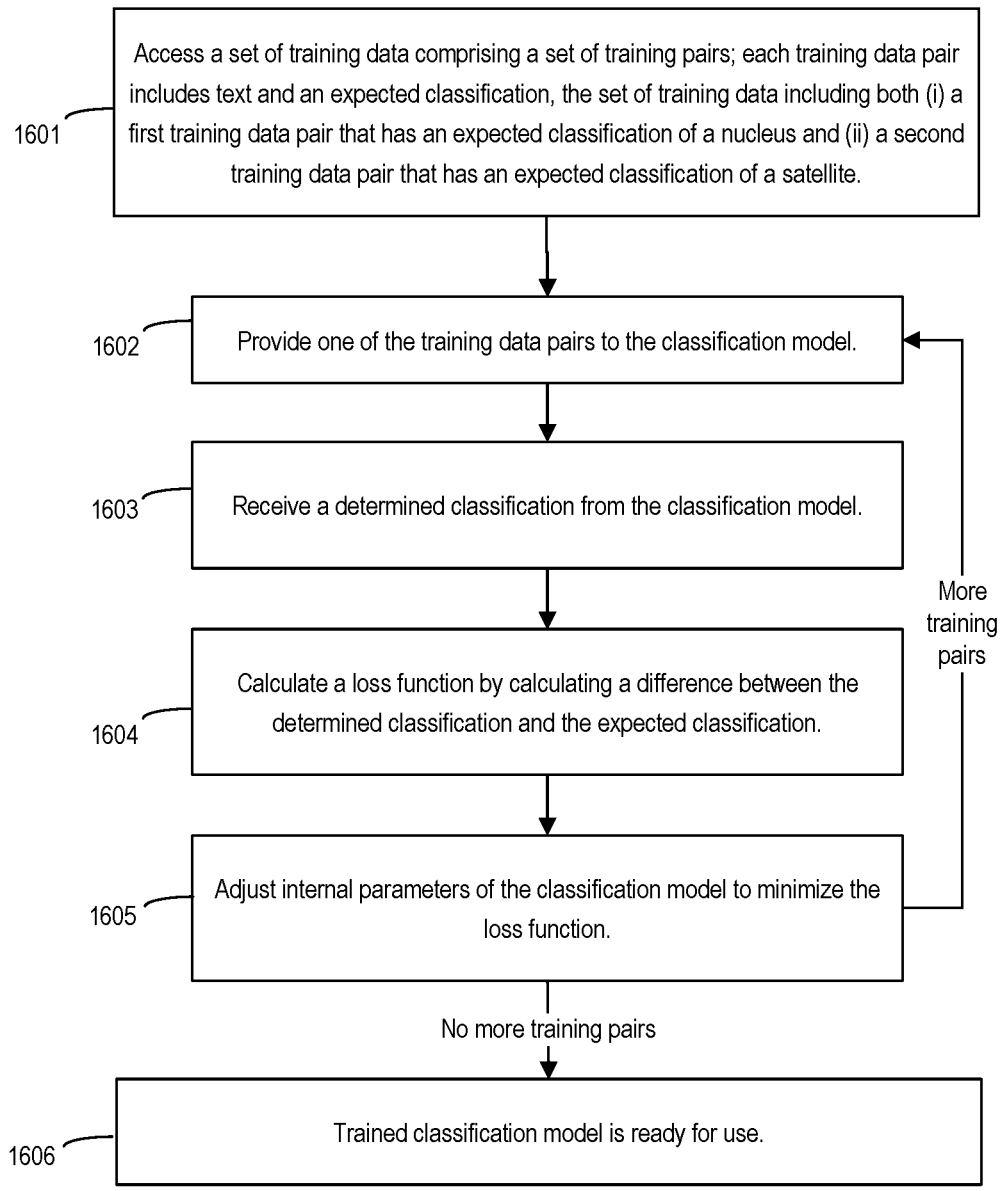
FIG. 16 depicts a flowchart illustrating an example of a process for training a classification model to determine informative parts of text for indexing, in accordance with an aspect.

FIG. 16 depicts a flowchart illustrating an example of a process for training a classification model to determine informative text for indexing, in accordance with an aspect. An example classification model is machine-learning model 120, which can use different models such as classifiers, Tree Kernels, or Support Vector Machine, or SVM TK.

At block 1601, process 1600 involves accessing a set of training data comprising a set of training pairs; each training data pair includes text and an expected classification, the set of training data including both (i) a first training data pair that has an expected classification of a nucleus and (ii) a second training data pair that has an expected classification of a satellite.

At block 1602, process 1600 involves providing one of the training data pairs to the classification model. Accordingly, the classification model receives a body of text and an expected classification.

At block 1603, process 1600 involves receiving a determined classification from the classification model.

At block 1604, process 1600 involves calculating a loss function by calculating a difference between the determined classification and the expected classification. Different loss functions are possible such as mean-square error, likelihood loss, log (or cross entropy) loss, etc.

At block 1605, process 1600 involves adjusting internal parameters of the classification model to minimize the loss function. In this manner, the classification model learns to improve the accuracy of its predictions.

At block 1606, process 1600 involves using the trained classification model. For example, the trained classification model can be used in processes 1200 or 1300. More specifically, the trained classification model can be used in place of the rule-based scheme discussed with respect to Table 4 and implemented in process 1200 or 1300.

Figure 17:
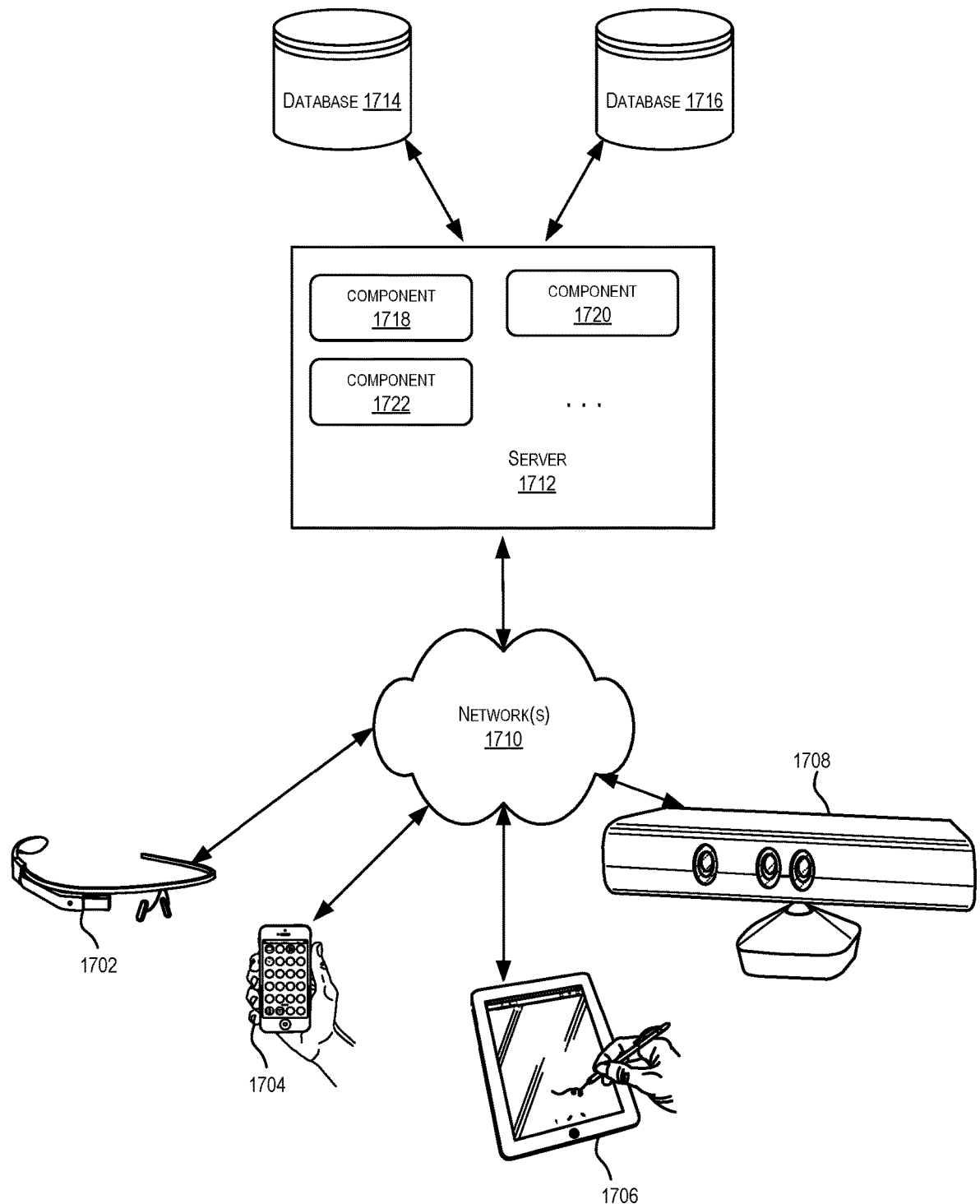
FIG. 17 depicts a simplified diagram of a distributed system for implementing one of the aspects.

FIG. 17 depicts a simplified diagram of a distributed system 1700 for implementing one of the aspects. In the illustrated aspect, distributed system 1700 includes one or more client computing devices 1702, 1704, 1706, and 1708, which are configured to execute and operate a client application such as a web browser, proprietary client (e.g., Oracle Forms), or the like over one or more network(s) 1710. Server 1712 may be communicatively coupled with remote client computing devices 1702, 1704, 1706, and 1708 via network 1710.

In various aspects, server 1712 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in the figure, the software components 1718, 1720 and 1722 of distributed system 1700 are shown as being implemented on server 1712. In other aspects, one or more of the components of distributed system 1700 and/or the services provided by these components may also be implemented by one or more of the client computing devices 1702, 1704, 1706, and/or 1708. Users operating the client computing devices may then utilize one or more client applications to use the services provided by these components. These components may be implemented in hardware, firmware, software, or combinations thereof. It should be appreciated that various different system configurations are possible, which may be different from distributed system 1700. The aspect shown in the figure is thus one example of a distributed system for implementing an aspect system and is not intended to be limiting.

Client computing devices 1702, 1704, 1706, and/or 1708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1702, 1704, 1706, and 1708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1710.

Although exemplary distributed system 1700 is shown with four client computing devices, any number of client computing devices may be supported. Other devices, such as devices with sensors, etc., may interact with server 1712.

Network(s) 1710 in distributed system 1700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1710 can be a local area network (LAN), such as one based on Ethernet, Token-Ring and/or the like. Network(s) 1710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.17 suite of protocols, Bluetooth®, and/or any other wireless protocol); and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1712 can include one or more virtual machines running virtual operating systems, or other computing architectures involving virtualization. One or more flexible pools of logical storage devices can be virtualized to maintain virtual storage devices for the server. Virtual networks can be controlled by server 1712 using software defined networking. In various aspects, server 1712 may be adapted to run one or more services or software applications described in the foregoing disclosure. For example, server 1712 may correspond to a server for performing processing described above according to an aspect of the present disclosure.

Server 1712 may run an operating system including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1712 may include one or more applications to analyze and consolidate data feeds and/or event updates received from users of client computing devices 1702, 1704, 1706, and 1708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more databases 1714 and 1716. Databases 1714 and 1716 may reside in a variety of locations. By way of example, one or more of databases 1714 and 1716 may reside on a non-transitory storage medium local to (and/or resident in) server 1712. Alternatively, databases 1714 and 1716 may be remote from server 1712 and in communication with server 1712 via a network-based or dedicated connection. In one set of aspects, databases 1714 and 1716 may reside in a storage-area network (SAN). Similarly, any necessary files for performing the functions attributed to server 1712 may be stored locally on server 1712 and/or remotely, as appropriate. In one set of aspects, databases 1714 and 1716 may include relational databases, such as databases provided by Oracle, that are adapted to store, update, and retrieve data in response to SQL-formatted commands.

Figure 18:
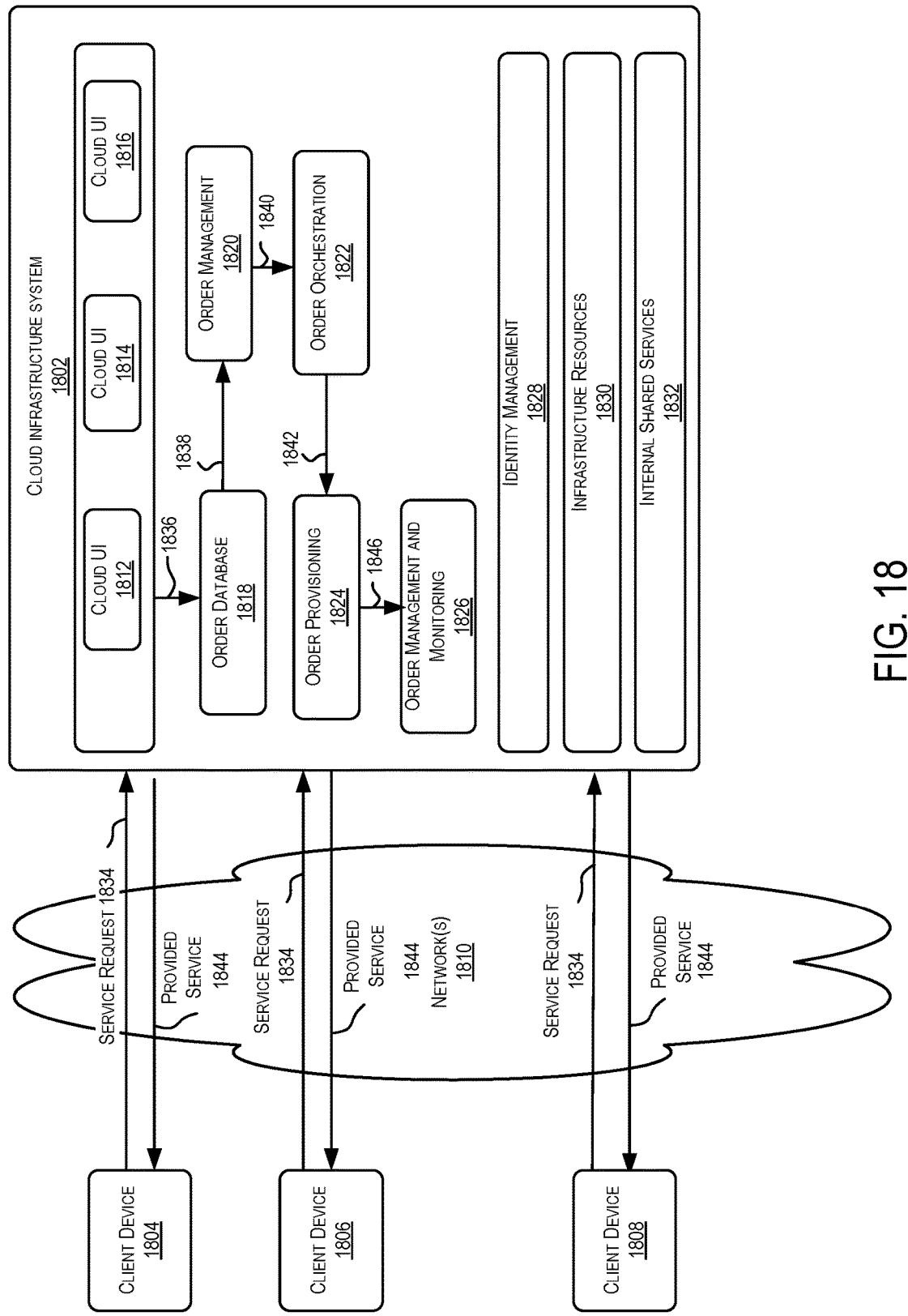
FIG. 18 is a simplified block diagram of components of a system environment by which services provided by the components of an aspect system may be offered as cloud services in accordance with an aspect.

FIG. 18 is a simplified block diagram of one or more components of a system environment 1800 by which services provided by one or more components of an aspect system may be offered as cloud services in accordance with an aspect of the present disclosure. In the illustrated aspect, system environment 1800 includes one or more client computing devices 1804, 1806, and 1808 that may be used by users to interact with a cloud infrastructure system 1802 that provides cloud services. The client computing devices may be configured to operate a client application such as a web browser, a proprietary client application (e.g., Oracle Forms), or some other application, which may be used by a user of the client computing device to interact with cloud infrastructure system 1802 to use services provided by cloud infrastructure system 1802.

It should be appreciated that cloud infrastructure system 1802 depicted in the figure may have other components than those depicted. Further, the aspect shown in the figure is only one example of a cloud infrastructure system that may incorporate an aspect of the invention. In some other aspects, cloud infrastructure system 1802 may have more or fewer components than shown in the figure, may combine two or more components, or may have a different configuration or arrangement of components.

Client devices 1804, 1806, and 1808 may be devices similar to those described above for 2802, 2804, 2806, and 2808.

Although exemplary system environment 1800 is shown with three client computing devices, any number of client computing devices may be supported. Other devices such as devices with sensors, etc. may interact with cloud infrastructure system 1802.

Network(s) 1810 may facilitate communications and exchange of data between client devices 1804, 1806, and 1808 and cloud infrastructure system 1802. Each network may be any type of network familiar to those skilled in the art that can support data communications using any of a variety of commercially-available protocols, including those described above for network(s) 1810.

Cloud infrastructure system 1802 may comprise one or more computers and/or servers that may include those described above for server 1712.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1802 may be adapted to automatically provision, manage and track a customer's subscription to services offered by cloud infrastructure system 1802. Cloud infrastructure system 1802 may provide the cloud services via different deployment models. For example, services may be provided under a public cloud model in which cloud infrastructure system 1802 is owned by an organization selling cloud services (e.g., owned by Oracle) and the services are made available to the general public or different industry enterprises. As another example, services may be provided under a private cloud model in which cloud infrastructure system 1802 is operated solely for a single organization and may provide services for one or more entities within the organization. The cloud services may also be provided under a community cloud model in which cloud infrastructure system 1802 and the services provided by cloud infrastructure system 1802 are shared by several organizations in a related community. The cloud services may also be provided under a hybrid cloud model, which is a combination of two or more different models.

In some aspects, the services provided by cloud infrastructure system 1802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1802. Cloud infrastructure system 1802 then performs processing to provide the services in the customer's subscription order.

In some aspects, the services provided by cloud infrastructure system 1802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1802 may also include infrastructure resources 1830 for providing the resources used to provide various services to customers of the cloud infrastructure system. In one aspect, infrastructure resources 1830 may include pre-integrated and optimized combinations of hardware, such as servers, storage, and networking resources to execute the services provided by the PaaS platform and the SaaS platform.

In some aspects, resources in cloud infrastructure system 1802 may be shared by multiple users and dynamically re-allocated per demand. Additionally, resources may be allocated to users in different time zones. For example, cloud infrastructure system 1830 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1832 may be provided that are shared by different components or modules of cloud infrastructure system 1802 and by the services provided by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1802 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1802, and the like.

In one aspect, as depicted in the figure, cloud management functionality may be provided by one or more modules, such as an order management module 1820, an order orchestration module 1822, an order provisioning module 1824, an order management and monitoring module 1826, and an identity management module 1828. These modules may include or be provided using one or more computers and/or servers, which may be general purpose computers, specialized server computers, server farms, server clusters, or any other appropriate arrangement and/or combination.

In exemplary operation 1834, a customer using a client device, such as client device 1804, 1806 or 1808, may interact with cloud infrastructure system 1802 by requesting one or more services provided by cloud infrastructure system 1802 and placing an order for a subscription for one or more services offered by cloud infrastructure system 1802. In certain aspects, the customer may access a cloud User Interface (UI), cloud UI 1818, cloud UI 1814 and/or cloud UI 1816 and place a subscription order via these UIs. The order information received by cloud infrastructure system 1802 in response to the customer placing an order may include information identifying the customer and one or more services offered by the cloud infrastructure system 1802 that the customer intends to subscribe to.

After an order has been placed by the customer, the order information is received via the cloud UIs, 1818, 1814 and/or 1816.

At operation 1836, the order is stored in order database 1818. Order database 1818 can be one of several databases operated by cloud infrastructure system 1802 and operated in conjunction with other system elements.

At operation 1838, the order information is forwarded to an order management module 1820. In some instances, order management module 1820 may be configured to perform billing and accounting functions related to the order, such as verifying the order, and upon verification, booking the order.

At operation 1840, information regarding the order is communicated to an order orchestration module 1822. Order orchestration module 1822 may utilize the order information to orchestrate the provisioning of services and resources for the order placed by the customer. In some instances, order orchestration module 1822 may orchestrate the provisioning of resources to support the subscribed services using the services of order provisioning module 1824.

In certain aspects, order orchestration module 1822 enables the management of business processes associated with each order and applies business logic to determine whether an order should proceed to provisioning. At operation 1842, upon receiving an order for a new subscription, order orchestration module 1822 sends a request to order provisioning module 1824 to allocate resources and configure those resources needed to fulfill the subscription order. Order provisioning module 1824 enables the allocation of resources for the services ordered by the customer. Order provisioning module 1824 provides a level of abstraction between the cloud services provided by cloud infrastructure system 1802 and the physical implementation layer that is used to provision the resources for providing the requested services. Order orchestration module 1822 may thus be isolated from implementation details, such as whether or not services and resources are actually provisioned on the fly or pre-provisioned and only allocated/assigned upon request.

At operation 1844, once the services and resources are provisioned, a notification of the provided service may be sent to customers on client devices 1804, 1806 and/or 1808 by order provisioning module 1824 of cloud infrastructure system 1802.

At operation 1846, the customer's subscription order may be managed and tracked by an order management and monitoring module 1826. In some instances, order management and monitoring module 1826 may be configured to collect usage statistics for the services in the subscription order, such as the amount of storage used, the amount data transferred, the number of users, and the amount of system up time and system down time.

In certain aspects, cloud infrastructure system 1802 may include an identity management module 1828. Identity management module 1828 may be configured to provide identity services, such as access management and authorization services in cloud infrastructure system 1802. In some aspects, identity management module 1828 may control information about customers who wish to utilize the services provided by cloud infrastructure system 1802. Such information can include information that authenticates the identities of such customers and information that describes which actions those customers are authorized to perform relative to various system resources (e.g., files, directories, applications, communication ports, memory segments, etc.). Identity management module 1828 may also include the management of descriptive information about each customer and about how and by whom that descriptive information can be accessed and modified.

Figure 19:
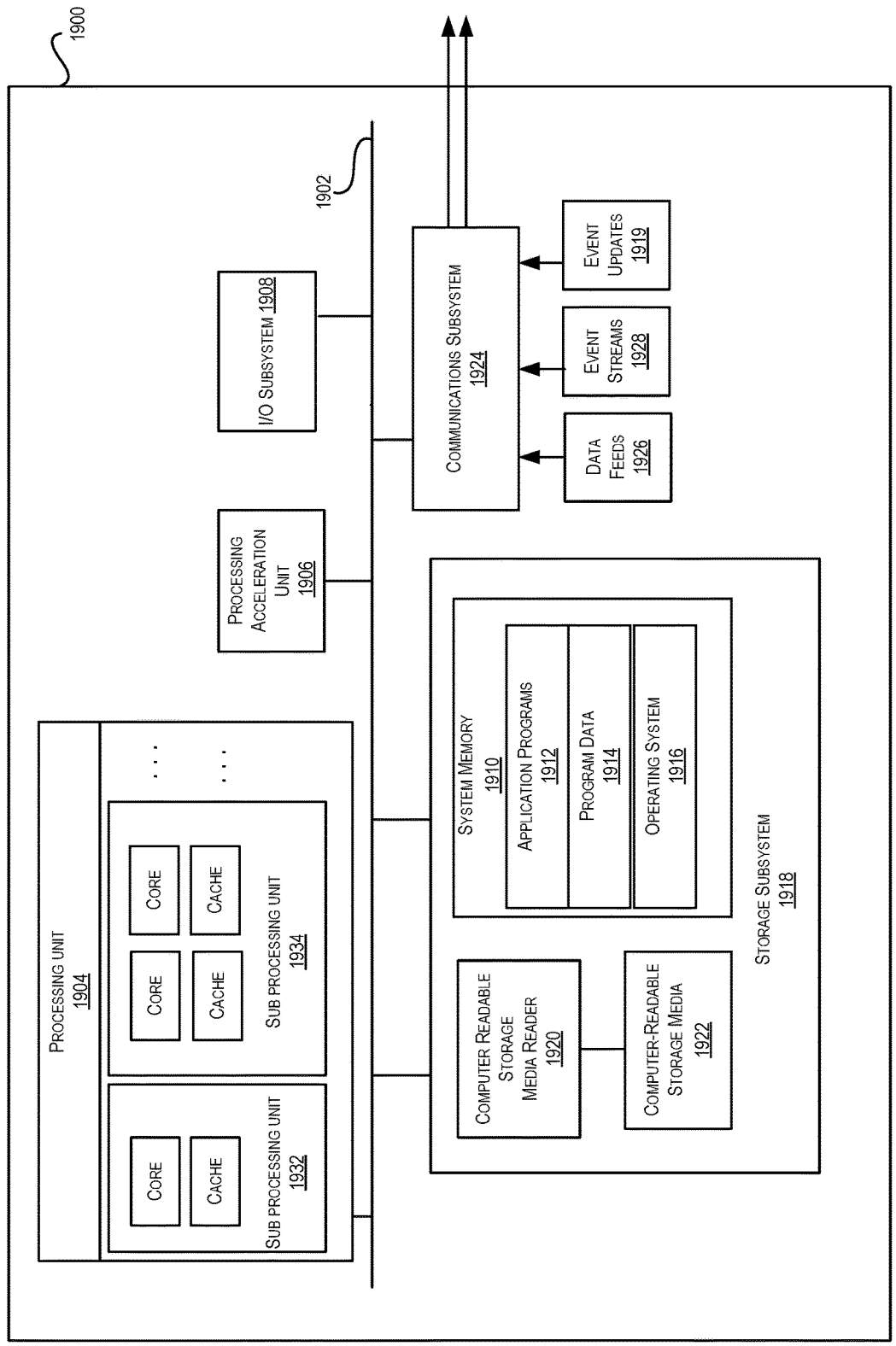
FIG. 19 illustrates an exemplary computer system, in which various aspects of the present invention may be implemented.

FIG. 19 illustrates an exemplary computer system 1900, in which various aspects of the present invention may be implemented. The system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative aspects of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1986.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain aspects, processing unit 1904 may be implemented as one or more independent processing units 1932 and/or 1934 with single or multicore processors included in each processing unit. In other aspects, processing unit 1904 may also be implemented as a quad-core processing unit formed by integrating two dual-core processors into a single chip.

In various aspects, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1918 may also provide a tangible computer-readable storage medium for storing the basic programming and data constructs that provide the functionality of some aspects. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with the present invention.

Storage subsystem 1918 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1900.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some aspects, communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1924 can provide wired network connectivity (e.g., Ethernet) in addition to or instead of a wireless interface.

In some aspects, communications subsystem 1924 may also receive input communication in the form of structured and/or unstructured data feeds 1926, event streams 1928, event updates 1919, and the like on behalf of one or more users who may use computer system 1900.

By way of example, communications subsystem 1924 may be configured to receive unstructured data feeds 1926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1919, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1919, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of indexing text, the method comprising:
accessing a body of text comprising fragments of text;
creating a discourse tree from the body of text, wherein the discourse tree comprises a plurality of nodes, each non-terminal node representing a rhetorical relationship between two of the fragments of text, and each terminal node is associated with one or more fragments and is associated with a non-terminal node;
for each non-terminal node of the discourse tree:
identifying, from the discourse tree, a rhetorical relationship associated with the non-terminal node,
labeling each terminal node associated with the non-terminal node as either a nucleus elementary discourse unit or a satellite elementary discourse unit,
accessing a rule corresponding to the identified rhetorical relationship, wherein the rule identifies for selection, based on the rhetorical relationship, one or more of (i) the nucleus elementary discourse unit or (ii) the satellite elementary discourse unit, and
selecting, based on the rule, one or more of (i) the fragment of text associated with the nucleus elementary discourse unit or the (ii) fragment of text associated with the satellite elementary discourse unit; and
creating a searchable index comprising multiple entries, each entry corresponding to a selected fragment.

2. The method of claim 1, further comprising:
determining, for each fragment, an additional question;
receiving a query from an external device;
searching, in each of the additional questions for matches corresponding to the query; and
responsive to determining a match in the additional questions, providing a response to the external device.

3. The method of claim 1, wherein each entry of the searchable index represents a question that can be answered by the body of text or a phrase to be matched to the question.

4. The method of claim 1, wherein the rule specifies (i) selecting the fragments associated with a nucleus elementary discourse unit and (ii) discarding fragments associated with a satellite elementary discourse unit.

5. The method of claim 1, wherein one or more fragments comprise clauses of compound sentences.

6. The method of claim 1, wherein each rhetorical relationship is one of an elaboration, enablement, condition, contrast, or attribution.

7. The method of claim 1, further comprising:
determining, for each fragment, an additional question; and
providing the additional questions to an external device.

8. The method of claim 1, further comprising:
identifying the rhetorical relationship as either (i) a same unit or a (ii) joint relationship; and
responsive to determining that the rule specifies accessing both (i) the nucleus and (ii) the satellite, selecting both (i) the nucleus elementary discourse unit and (ii) the satellite elementary discourse unit.

9. The method of claim 1, further comprising:
identifying the rhetorical relationship as an attribution relationship; and
responsive to determining that the rhetorical relationship does not represent a query by an author, selecting the nucleus elementary discourse unit.

10. A method comprising:
accessing a question-answer index, wherein each answer of the question-answer index comprises fragments of text;
creating, for each answer, a discourse tree, wherein the discourse tree comprises a plurality of nodes, each non-terminal node representing a rhetorical relationship between two of the fragments of text and each terminal node is associated with one or more fragments of text;
for each non-terminal node in the discourse tree of each answer:
identifying, from the respective discourse tree, a rhetorical relationship associated with the non-terminal node,
labeling each terminal node associated with the non-terminal node as either a nucleus elementary discourse unit or a satellite elementary discourse unit,
accessing a rule corresponding to the identified rhetorical relationship, wherein the rule identifies for selection, based on the identified rhetorical relationship, either the nucleus elementary discourse unit or the satellite elementary discourse unit, and
selecting, based on the rule, one or more of (i) the fragment of text associated with the nucleus elementary discourse unit or (ii) the fragment of text associated with the satellite elementary discourse unit; and
creating an index of additional questions comprising multiple entries, each entry corresponding to an answer found in one of the selected fragments of text.

11. The method of claim 10, method further comprising:
receiving a query from an external device;
searching, in each question of the question-answer index, for a match corresponding to the query;
responsive to determining that fewer than a threshold number of matches are available, searching for additional matches to the query in the index of additional questions;
responsive to determining that fewer than an additional threshold number of additional matches are available in the index of additional questions, searching for further matches in each answer in the question-answer index; and
providing the matches to the external device.

12. The method of claim 10, further comprising:
identifying the rhetorical relationship as either (i) a same unit or a (ii) joint relationship, and
selecting both (i) the nucleus elementary discourse unit and (ii) the satellite elementary discourse unit, wherein the rule specifies accessing both (i) the nucleus elementary discourse unit and (ii) the satellite elementary discourse unit.

13. The method of claim 10, further comprising:
identifying the rhetorical relationship as an attribution relationship, and
responsive to determining that the rhetorical relationship does not represent a query by an author, selecting the nucleus.

14. The method of claim 10, wherein each entry represents an additional question that can be answered by the respective answer.

15. The method of claim 10, wherein the rule specifies (i) selecting the fragments associated with a nucleus elementary discourse unit and (ii) discarding fragments associated with a satellite elementary discourse unit.

16. The method of claim 10, wherein one or more fragments comprise clauses of compound sentences.

17. The method of claim 10, wherein each rhetorical relationship is one of an elaboration, enablement, condition, contrast, or attribution.

18. A method of training a classification model, the method comprising:
accessing a set of training data comprising a set of training data pairs, wherein each training data pair comprises text and an expected classification and wherein the set of training data includes both (i) a first training data pair that has an expected classification of a nucleus elementary discourse unit of a training discourse tree and (ii) a second training data pair that has an expected classification of a satellite elementary discourse unit of a training discourse tree; and
training a classification model by iteratively:
providing one of the training data pairs to the classification model;
receiving, from the classification model, a determined classification that is indicative of either a nucleus elementary discourse unit or a satellite elementary discourse unit;
calculating a loss function by calculating a difference between the determined classification and the expected classification; and
adjusting internal parameters of the classification model to minimize the loss function.

19. The method of claim 18, further comprising:
accessing a body of text comprising fragments;
creating a discourse tree from the body of text, wherein the discourse tree comprises a plurality of nodes, each non-terminal node representing a rhetorical relationship between two of the fragments and each terminal node associated with one or more fragments;
for each non-terminal node:
identifying a rhetorical relationship associated with the non-terminal node;
providing a fragment of text associated with the non-terminal node and the rhetorical relation to the classification model;
receiving, from the classification model, a classification indicating whether the fragment of text is associated with a nucleus or a satellite; and
identifying the fragment of text as informative or not informative based on the classification and the rhetorical relationship; and
creating a searchable index of additional questions comprising each of the fragments identified as informative.

20. The method of claim 19, further comprising:
receiving a query from an external device;
searching, in each of question of a plurality of question-answer pairs, for matches corresponding to the query;
responsive to determining that fewer than a threshold number of matches are available, searching, in the searchable index of additional questions, for additional matches to the query;

responsive to determining that fewer than a threshold number of additional matches are available in the searchable index of additional questions, searching for further matches in each answer of the plurality of question-answer pairs; and providing a response to the external device.

* * * * *

UNITED STATES PATENT AND TRADEMARK OFFICE
CERTIFICATE OF CORRECTION

PATENT NO. : 11,182,412 B2
APPLICATION NO. : 16/142759
DATED : November 23, 2021
INVENTOR(S) : Galitsky It is certified that error appears in the above-identified patent and that said Letters Patent is hereby corrected as shown below:

On the Title Page

On page 3, Column 1, item (56), under Other Publications, Line 16, delete "7'h" and insert -- 7th --, therefor.

On page 3, Column 1, item (56), under Other Publications, Line 44, delete "48'th" and insert -- 48th --, therefor.

In the Drawings

On sheet 5 of 19, in FIG. 5, Line 5, delete "In" and insert -- It --, therefor.

On sheet 13 of 19, in FIG. 13, under Reference Numeral 1305, Line 3, delete "the an" and insert -- the --, therefor.

In the Specification

In Column 6, Line 38, delete "a an" and insert -- an --, therefor.

In Column 8, Line 33, delete "History" and insert -- History. --, therefor.

In Column 8, Line 35, delete "attend" and insert -- attend. --, therefor.

In Column 8, Line 37, delete "Hawaii" and insert -- Hawaii. --, therefor.

In Column 9, Line 8, delete "clauses" and insert -- clauses. --, therefor.

In Column 11, Line 2, delete "were" and insert -- where --, therefor.

In Column 11, Line 26, delete "are.'"" and insert -- are.' --, therefor.

Signed and Sealed this
Nineteenth Day of April, 2022

*Katherine Kelly Vidal*
Katherine Kelly Vidal
*Director of the United States Patent and Trademark Office*

CERTIFICATE OF CORRECTION (continued)
U.S. Pat. No. 11,182,412 B2

In Column 12, Lines 8-9, delete "[0097] "By the time" elaborated by "it came to sending off the title"" and insert the same in Column 12, Line 9, as a new paragraph.

In Column 14, Line 12, delete ""[t]o" and insert -- "to --, therefor.

In Column 14, Line 57, delete "1124)" and insert -- 1124). --, therefor.

In Column 14, Line 64, delete "1122)" and insert -- 1122). --, therefor.

In Column 18, Line 39, delete "the an" and insert -- the --, therefor.

In Column 18, Line 53, delete "FaceBook®" and insert -- Facebook® --, therefor.

In Column 18, Line 54, delete "Slack,®" and insert -- Slack®, --, therefor.

In Column 19, Line 47, delete "intern&" and insert -- internet --, therefor.

In Column 31, Line 10, delete "(e.g.," and insert -- e.g., --, therefor.